(12) United States Patent
Kim et al.

(10) Patent No.: US 7,732,940 B2
(45) Date of Patent: Jun. 8, 2010

(54) APPARATUS AND METHOD FOR REDUCING NEUTRAL LINE CURRENT USING LOAD SWITCHING METHOD

(75) Inventors: Chul Hwan Kim, Seongnam-si (KR); Keon Woo Park, Seoul (KR)

(73) Assignee: Sungkyunkwan University Foundation For Corporate Collaboration, Suwon-Si, Gyeonggi-Do (KR)

( * ) Notice: Subject to any disclaimer, the term of this patent is extended or adjusted under 35 U.S.C. 154(b) by 420 days.

(21) Appl. No.: 11/863,538

(22) Filed: Sep. 28, 2007

(65) Prior Publication Data

US 2009/0085403 A1    Apr. 2, 2009

(30) Foreign Application Priority Data

Aug. 21, 2007    (KR) .................. 10-2007-0084186

(51) Int. Cl.
*H02J 3/26* (2006.01)
*H02H 3/26* (2006.01)

(52) U.S. Cl. .................. 307/14; 307/13; 361/48; 361/61; 361/63; 361/76

(58) Field of Classification Search .................. 307/13, 307/14; 361/48, 61, 63, 76
See application file for complete search history.

(56) References Cited

U.S. PATENT DOCUMENTS 4,406,008 A    9/1983    Konig et al.
6,018,203 A *  1/2000    David et al. .................. 307/52
7,242,110 B2 * 7/2007    Matsumoto et al. .......... 307/14

FOREIGN PATENT DOCUMENTS

| JP | 1986-266020    | 5/1988  |
| JP | 2000-514279    | 10/2000 |
| JP | 2004-312848    | 11/2004 |
| KR | 20-1995-004479 | 12/1995 |

OTHER PUBLICATIONS

Tsai-Hsiang Chen et al., Optimal Phase Arrangement of Distributon Transformers Connected to a Primary Feeder for System Unbalance Improvement and Loss Reduction Using a Genetic Algorithm, IEEE Transactions on Power Systemns, vol. 15, NP.3, Aug. 2000, pp. 994-1000.

* cited by examiner

*Primary Examiner*—Albert W Paladini
*Assistant Examiner*—Hal I Kaplan

(57) ABSTRACT

An apparatus for reducing a neutral current using a load switching method in accordance with the present invention includes a phase current detection unit for detecting a phase current in each of a top stage power line and a bottom stage power line, a load switching unit for changing an arrangement of a load connected each phase of at least one among the top stage power line and the bottom stage power line and a control unit for controlling the load switching unit so as to compare a strength of the detected phase current of the top stage power line with a strength of the detected phase current of the bottom stage power line and to change the arrangement of the load connected to each phase of at least one among the top stage power line and the bottom stage power line according to the comparison result.

33 Claims, 21 Drawing Sheets

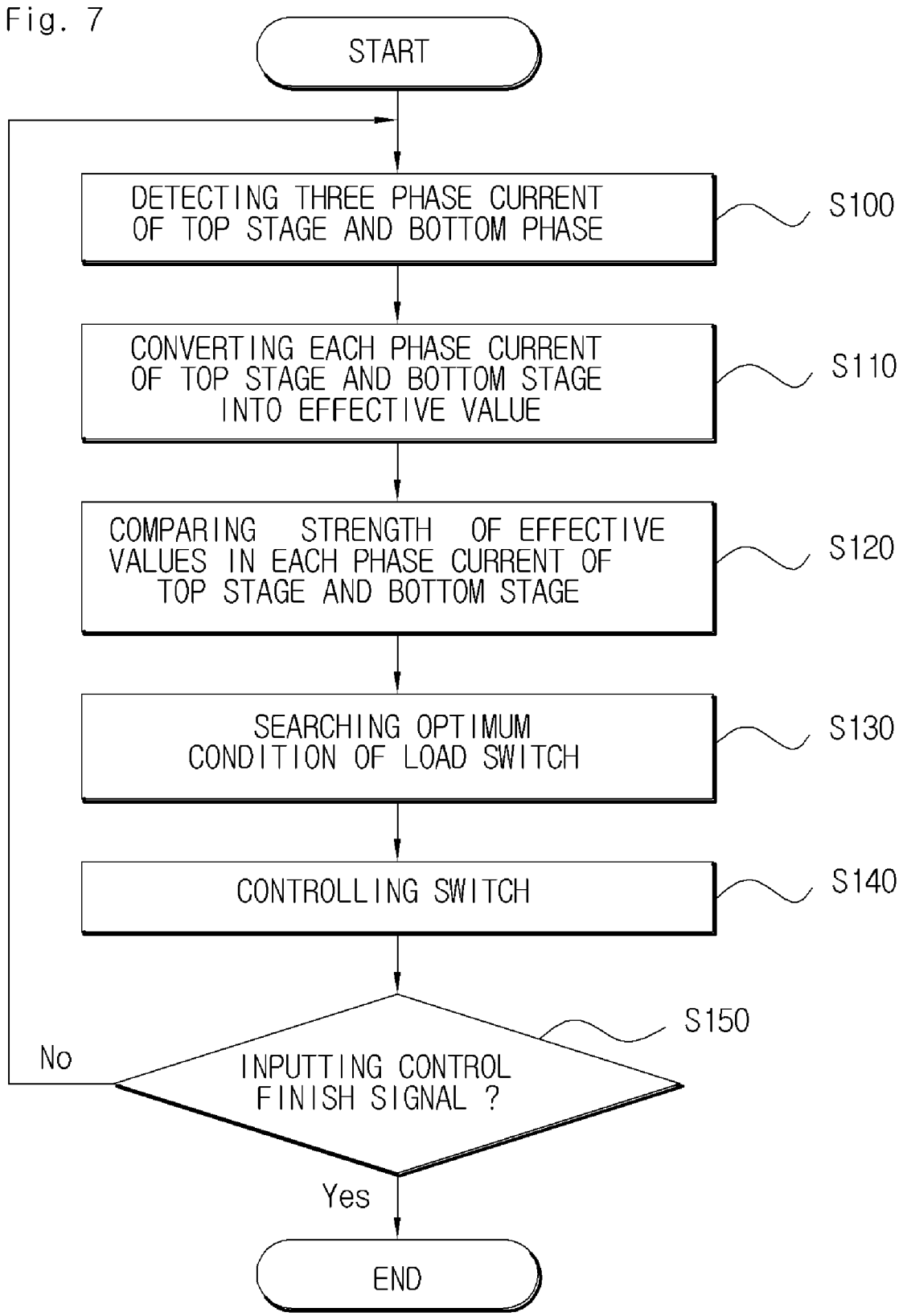

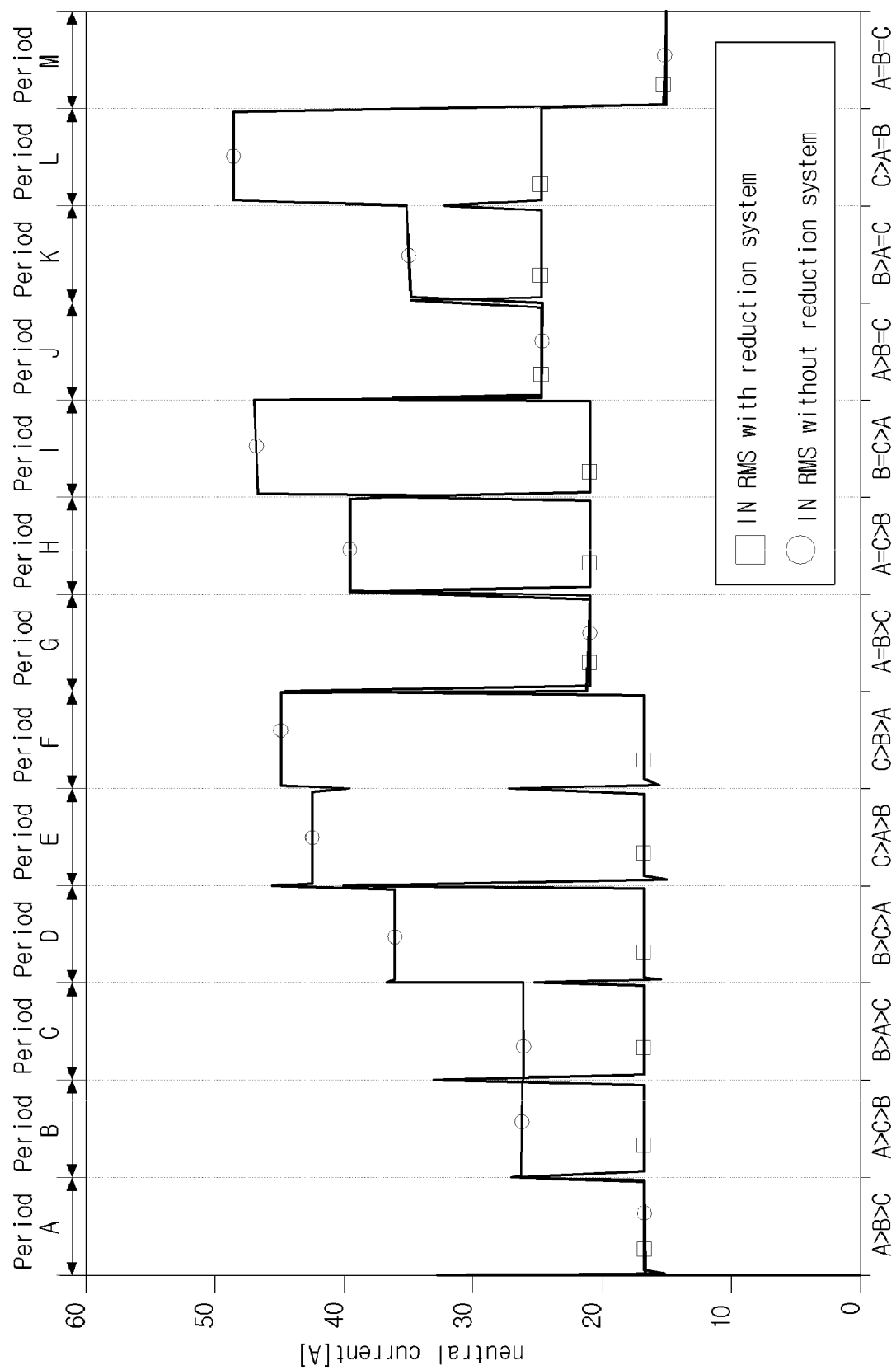

APPARATUS AND METHOD FOR REDUCING NEUTRAL LINE CURRENT USING LOAD SWITCHING METHOD

BACKGROUND OF THE INVENTION

1. Field of the Invention

The present invention relates to an apparatus and a method for reducing a neutral current in a three-phase four-wire type power distribution system; and, more particularly, to an apparatus and a method for reducing a neutral current by changing an arrangement of loads connected to each phase of at least one among top and bottom stage power lines according to a level of each phase current of the top and the bottom stage power lines in a three-phase four-wire type two stage electric pole in a power distribution system.

2. Background of the Related Art

Currently, a three-phase four-wire type Y-connection power distribution system is adopted as a standard power distribution method in Korea, USA, Canada, Taiwan, etc. In a partial period, the power distribution system is operated with a one-stage electric pole in combination with a two-stage electric pole. In the three-phase four-wire type power distribution system, a conduction line drawn by being connected to a neutral point of Y-connection is referred as a neutral line, for the case of the two stage electric pole in power distribution system, as shown in FIG. 1, three-phase currents flow through each of a top stage power line 1 and a bottom stage power line 2, individually, and a neutral line(not shown) prepared at the neutral line power line 3 is commonly used by the top stage power line 1 and the bottom stage power line 2.

Theoretically, in case of the three-phase four-wire type two stage electric pole in power distribution system, a normal power distribution state, i.e., when the loads connected to phase lines (not shown) in each of the top stage power line 1 and the bottom stage power line 2 become an equilibrium state to each other, the current flowing through the neutral line becomes 0.

However, as the usages of nonlinear and imbalance loads such as a computer device, an UPS(Uninterruptible Power Supply), a rectifying device, an illumination device and an office device have been rapidly increased recently in a commercial building, a residential building and a factory or the like, the current due to the imbalance of the load flows excessively at the neutral line in a practical power distribution system.

In case that the current flows through the neutral line due to the above-described imbalance load, there occur overheats of the neutral line and fire, and an insulation breakage and erroneous operations of various devices. Further, in case that the non-linear load among the loads increases, there occur problems that the other facilities are damaged in the system by flowing a harmonic wave current into a side of the power supply.

Therefore, in order to solve the above-described problems, various techniques have been proposed for reducing the current flowing into the neutral line. A conventional neutral line current reduction technique applies the method of installing a zigzag transformer or a filter circuit on the phase line and the neutral line of the three-phase power for a one-stage electric pole in a power distribution system. The detailed contents for these are disclosed in detail in the following reference 1 and reference 2 or the like.

However, the conventional techniques disclosed in the following references 1 and 2 or the like do not contain an example which is applied to a two-stage electric pole in a power distribution system. Also there are the problems of the installation being complex and a great deal of cost being consumed since construction of hardware, such as a transformer or a filter circuit, is complex and a large space is required.

And also, although assumes that the conventional techniques disclosed in the following references 1 and 2 or the like are applied to the three-phase four-wire type two stage electric pole power distribution system, such conventional techniques have problems that it is difficult for actively coping with the case that the loads connected to the phases of each of the top stage power line 1 and the bottom stage power line 2 are changed with the lapse of time.

[Reference 1] Korean registration patent No. 557778 (Registered on Feb. 27, 2006)

[Reference 2] Korean Publication patent No. 2004-8610 (Published on Jan. 31, 2004)

SUMMARY OF THE INVENTION

Technical Problem

The present invention has been proposed in order to overcome the above-described problems in the related. It is, therefore, an object of the present invention to provide an apparatus and a method for reducing a current flowing through a neutral line of a three-phase four-wire type two stage electric pole in power distribution system by only using a simple switch device without using hardware which is complex in installing and costs a great deal.

It is another object of the present invention to provide an apparatus and a method for optimally reducing a current flowing through a neutral line of a three-phase four-wire type two stage electric pole in power distribution system by actively coping with a change of loads according to the time.

Technical Solution

In accordance with an aspect of the present invention, there is provided an apparatus for reducing a current flowing through a neutral line of a three-phase four-wire type two stage electric pole distribution system comprising: a phase current detection unit detecting a phase current in each of a top stage power line and a bottom stage power line; a load switching unit changing an arrangement of a load connected each phase of at least one among the top stage power line and the bottom stage power line; and a control unit comparing strengths of the detected phase currents of the top stage power line and the bottom stage power line and controlling the load switching unit so as to change the arrangement of the load connected to each phase of at least one among the top stage power line and the bottom stage power line according to the compared result.

And also, the controlling unit changes the arrangement of the load such that an order for the phases of the top stage power line and an order of the phases of the bottom stage power line according to strength of phase currents are opposite from each other.

And also, the apparatus for reducing a current flowing a neutral line of a three-phase four-wire type two stage electric pole in power distribution system further comprise a memory unit storing a condition table about the order for phases of the top stage power line and the bottom stage power line according to strength of phase currents, and the arrangement of the loads corresponding to the order according the strength of the phase currents, wherein the controlling unit searches the arrangement of the load corresponding to the strength of the phase currents detected by the phase current detection unit from the condition table and changes the arrangement of the load according to the searched arrangement in case that phases having the same current strength to each other exist in one of the top stage power line and the bottom stage power line.

And also, the controlling unit changes the arrangement of the load connected to one of the top stage power line and the bottom stage power line with reference to the order of the strength of the phase currents of each phases of the other of the top stage power line and the bottom stage power line.

And also, the phase current detection unit is prepared at a load input stage connected to each of the top stage power line and the bottom stage power line.

And also, the controlling unit converts the detected phase currents into effective values to compares sizes of the converted effective values.

And also, the load switching unit is prepared at each phase of any one power line among the top stage power line and the bottom stage power line, and each of the load switching units connects any one among loads connected to each phase of any one power line according to a control signal of the controlling unit.

And also, each of the load switching units is made of a relay.

In accordance with another aspect of the present invention, there is provided a method for reducing a current flowing a neutral line of a three-phase four-wire type two stage electric pole in power distribution system, comprising: detecting phase currents in each of a top stage power line and a bottom stage power line; comparing the detected strengths of the phase currents of the top stage power line and the bottom stage power line; and changing an arrangement of loads connected to each phase of any one among the top stage power line and the bottom stage power line according to the comparison result.

Effect of the Invention

Since an apparatus and a method for reducing a current flowing into a neutral line using a load switching method in accordance with the present invention employ a method to reduce the current flowing into the neutral line of three-phase four-wire type two stage electric pole in power distribution system by using a simple switch device, they have advantages that the apparatus is easily installed and drastically reduced in costs in comparison with a conventional method.

And also, the present invention is capable of actively and rapidly coping with the load change by controlling the switching device so as to optimally reduce the current flowing into the neutral line of the three-phase four-wire type two stage electric pole in power distribution system according to the change of the load.

BRIEF DESCRIPTION OF THE DRAWINGS

FIG. 7 is a flow chart representing a method for reducing a current of a neutral line by using a load switching method in accordance with another embodiment of the present invention.

DETAILED DESCRIPTION OF THE INVENTION

Hereinafter, a preferred embodiment of the present invention will be described in detail with reference to the accompanying drawings.

Figure 1:
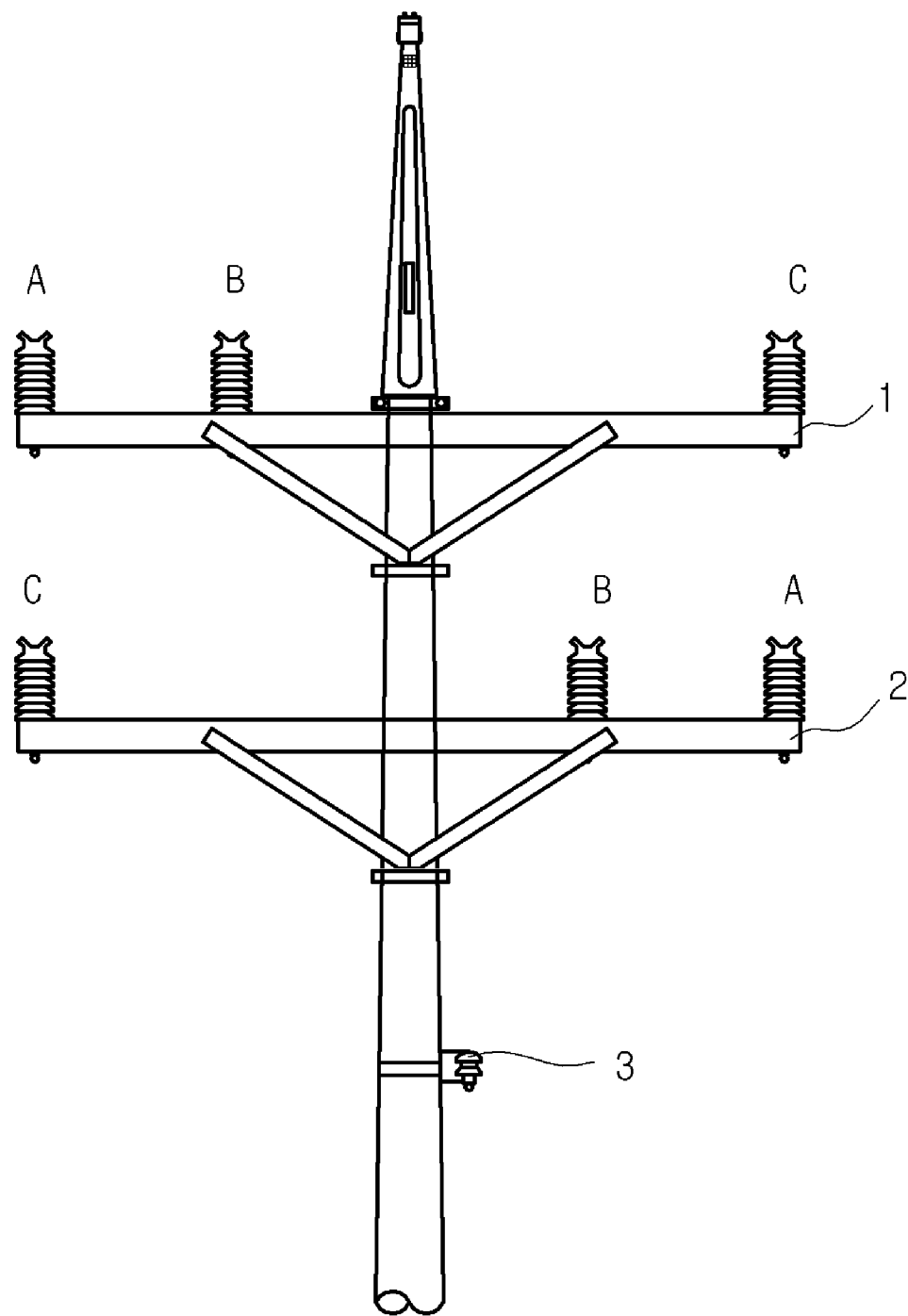
FIG. 1 is a diagrams showing three-phase four-wire type two stage electric pole in power distribution system.
Figure 2A:
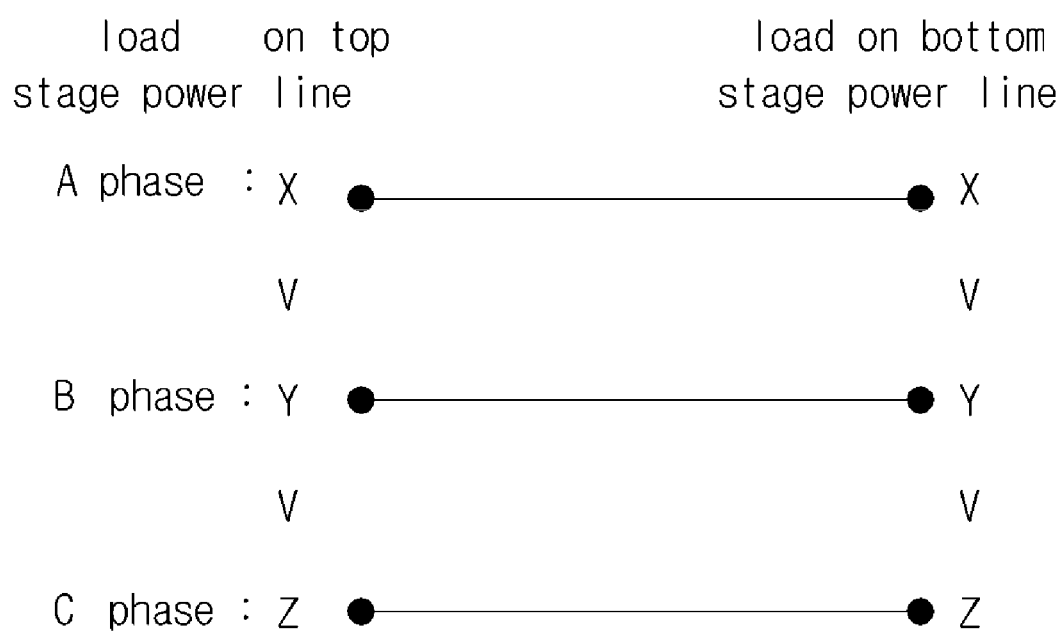
FIGS. 2a and 2b are diagrams representing arrangement conditions of load sizes that currents of a neutral line become maximum and minimum at each of three-phase four-wire type two stage electric pole.
Figure 2B:
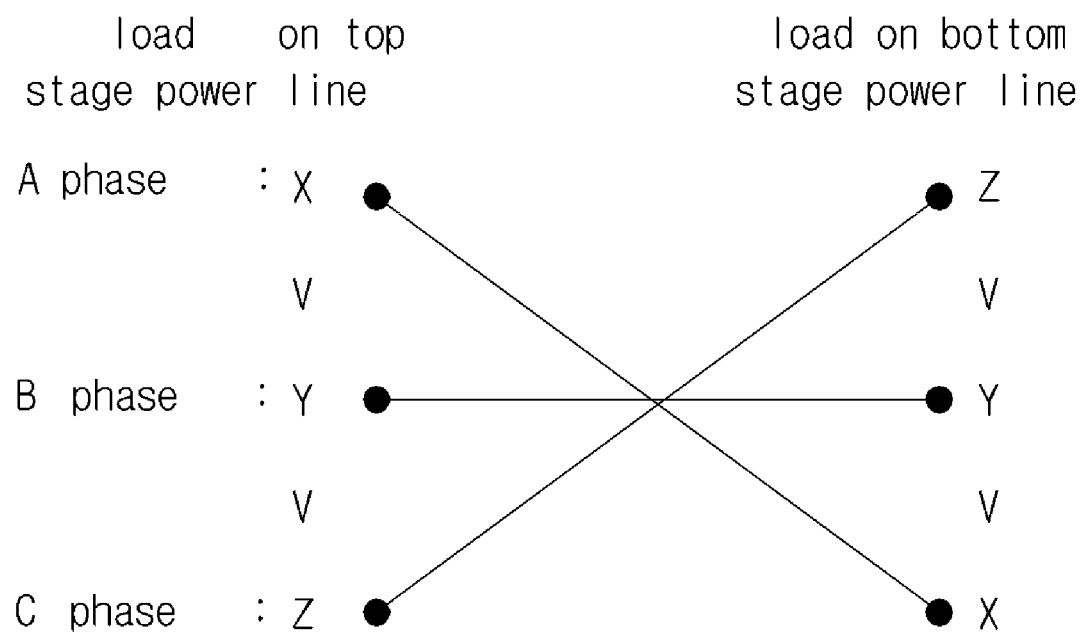

FIG. 2a and FIG. 2b are diagrams representing cases that intensities of currents flowing through neutral lines in each of three-phase four-wire type two stage electric pole in power distribution system become maximum and minimum, respectively. According to the theoretical background of the present invention, the intensity of the current flowing into the neutral line becomes maximum in case that the sizes of loads connected to each phase (A, B and C phases) of the top stage power line 1 and the bottom stage power line 2 are equally increased or decreased in phase order as shown in FIG. 2a for three-phase four-wire type two stage electric pole in power distribution system, and the intensity of the current flowing through the neutral line becomes minimum in case that the sizes of loads connected to each phase (A, B and C phases) of the top stage power line 1 and the bottom stage power line 2 are oppositely increased or decreased from each other in phase order as shown in FIG. 2b.

As such theoretical background of the present invention is obtained through a simulation result using an EMTP (Electromagnetic Transient Program)/MODELS, the detailed description for this is disclosed in detail at a paper published on The Korean Institute of Electric Engineers in the title of "A STUDY ON THE EFFECTS OF NEUTRAL CURRENT BY UNBALANCED LOAD IN TWO STEP TYPE POLE USING KEPCO'S DISTRIBUTION SYSTEM" by inventors of the present invention(in KIEE. Vol. 56, No. 3, March 2007).

Figure 3:
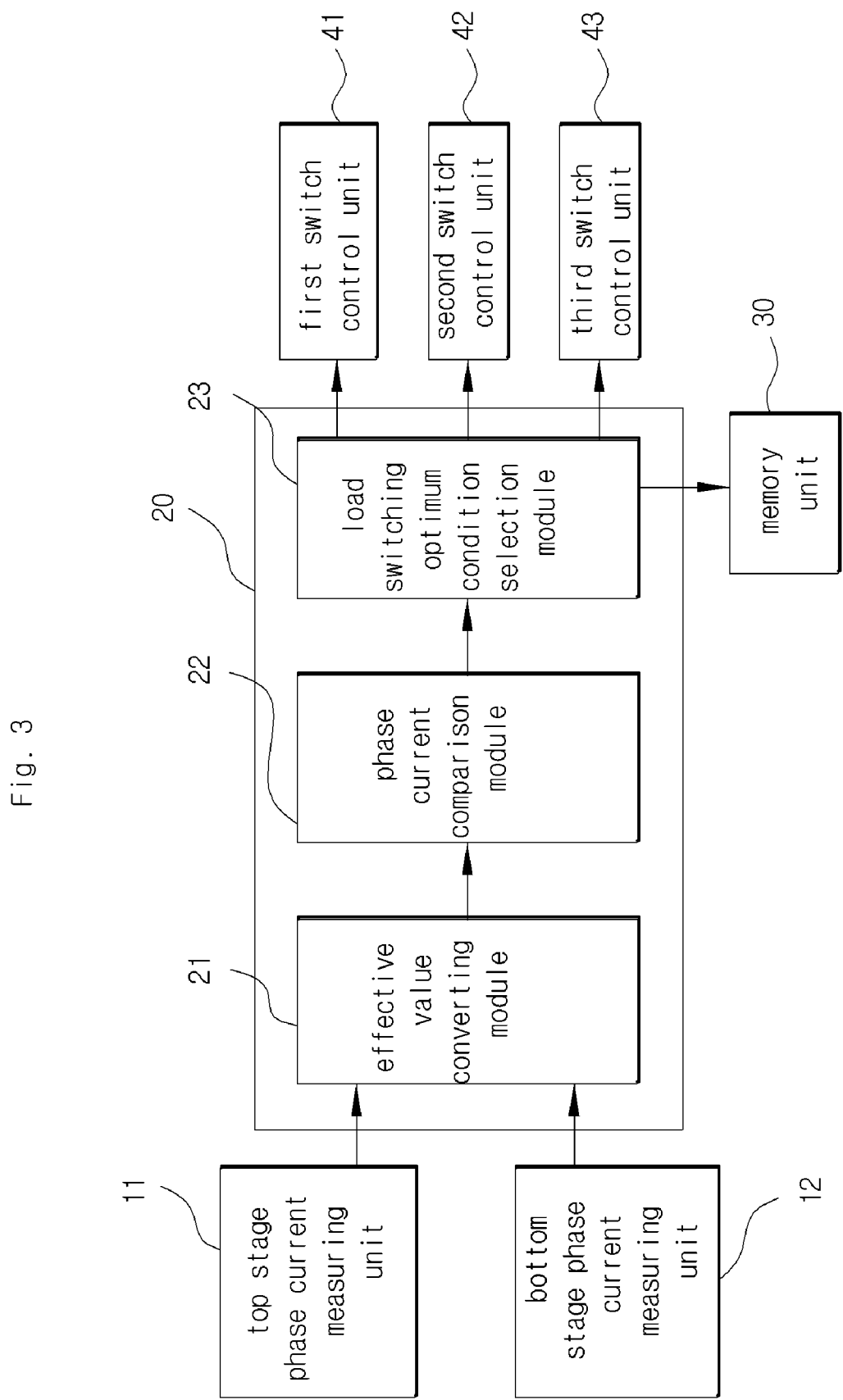
FIG. 3 is a block diagram illustrating a configuration of an apparatus for reducing a current of a neutral line by using a load switching method in accordance with one embodiment of the present invention.
Figure 4:
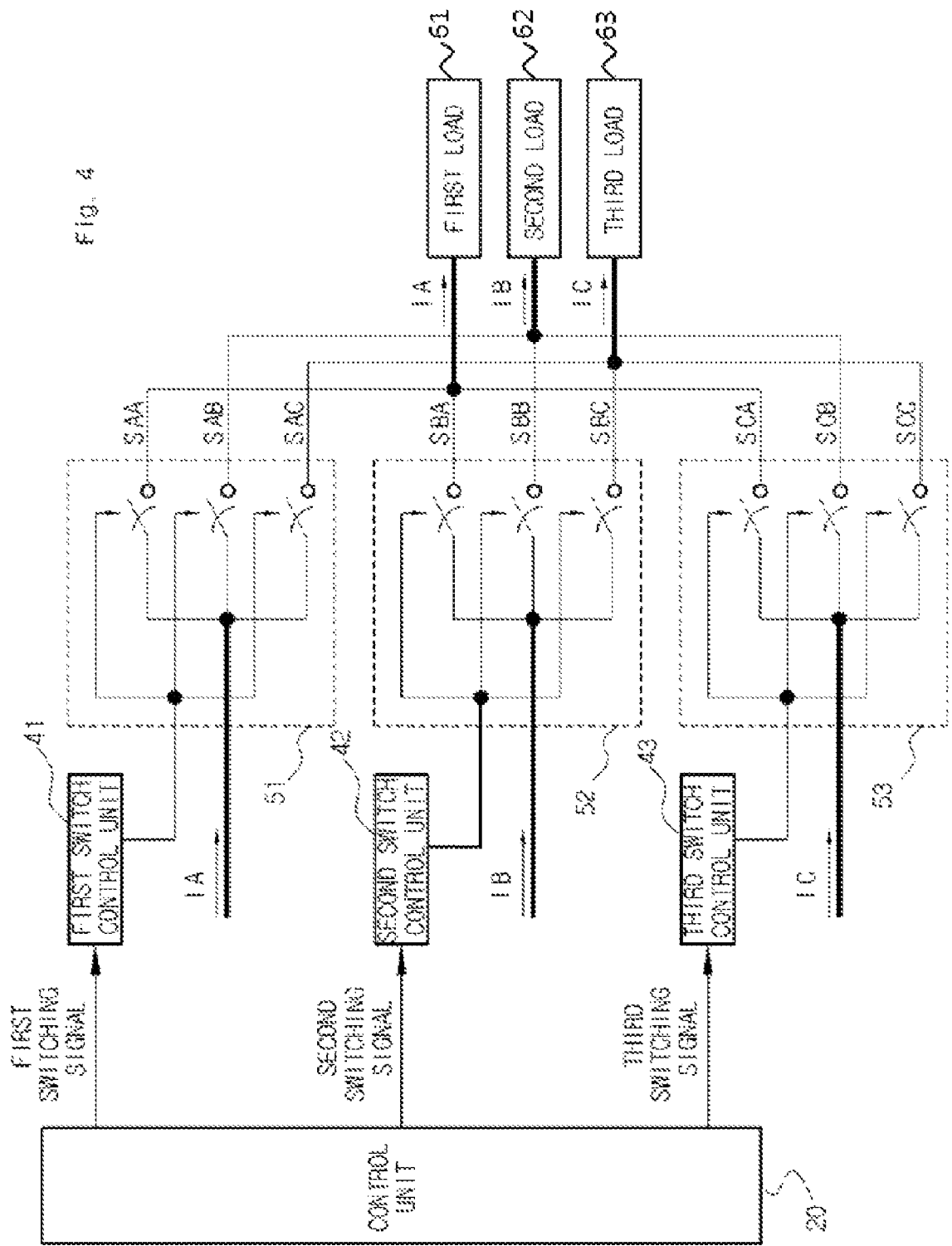
FIG. 4 is a diagram depicting a configuration of a switching control unit in the apparatus for reducing the current of the neutral line by using the load switching method in accordance with the embodiment of the present invention.

FIG. 3 is a block diagram representing a construction of a neutral current reduction apparatus using a load switching method in accordance with one embodiment of the present invention and FIG. 4 is a diagram illustrating a switching unit in accordance with the embodiment of the present invention.

In FIG. 3, each phase current of each of the top stage power line 1 and the bottom stage power lines 2 is measured by a top stage phase current measuring unit 11 and a bottom stage phase current measuring unit 12, and then an effective value converting module 21 of a control unit 20 converts each of the measured phase currents at the top stage power line and the bottom stage power line 2 into effective values.

At this time, a reason to convert each of the phase currents into the effective values is that strength of currents flowing into each phase to be compared in real time is difficult, since a voltage and a current of a power distribution system represent a non-linear characteristic as a sine wave having a predetermined frequency. Therefore, the strength of each phase current are compared with each other by converting the current into an effective value representing linearity.

When each of the phase currents is converted into the effective values at the effective value converting module 21 of the control unit 20, a phase current comparison module 22 of the control unit 20 compares the strength of the current of each phase, i.e., A, B and C phases, for each of the top stage power line 1 and the bottom stage power line 2. At this time, since the strength of each phase currents are in proportion to the sizes of loads connected thereto, the strength in the phase currents has the same order as that of the loads at that point of time.

After a load switching optimum condition selection module 23 of the control unit 20 searches the comparison result in a condition table previously stored at a memory unit 30 and selects an optimum condition having a current flowing through a neutral line with a smallest strength. The load switching optimum condition selection module 23 transmits first, second and third switching signals to each of first, second and third switch control units 41, 42 and 43 as a signal for the switch control.

The first, the second and the third switch control units 41, 42 and 43 control operations of first, second and third switch units 51, 52 and 53 according to the switching signals respectively transmitted from the control unit 20, as shown in FIG. 4. At this time, it is preferable that the first, the second and the third switch control units 41, 42 and 43 and the first, the second and the third switch units 51, 52 and 53 are installed on at least one of the top stage power line 1 and the bottom stage power line 2. In accordance with the embodiment of the present invention, it is explained that the first, the second and the third switch control units 41, 42 and 43 and the first, the second and the third switch units 51, 52 and 53 are installed only on the top stage power line 1 as one example.

And also, in accordance with the embodiment of the present invention, the first, the second and the third switch units 51, 52 and 53 perform functions of electrically connecting any one among three loads 61, 62 and 63 connected to the top stage power line 1 to each phase line of the top stage power line 1. Such functions are preferably implemented by using an electric relay or the like.

Meanwhile, in accordance with the embodiment of the present invention, although it is explained for a case that the first, the second and the third switch control units 41, 42 and 43 and the first, the second and the third switch units 51, 52 and 53 are installed only on the top stage power line 1, they can be installed on the bottom stage power line 2 or installed on both of the top stage power line 1 and the bottom stage power line 2 on in case of need. Here, in case of being installed on both of the top stage power line 1 and the bottom stage power line 2, after searching an optimum load arrangement of one of the power lines 1 and 2 with reference to an order of strength of the phase currents for the other power line to easily search the optimum condition of the switch control in the condition table, it is preferable that the load arrangement of the other power line is changed according to the search result.

At this time, in the condition table previously stored at the memory unit 30, information for the arrangement of loads connected to each phase line of the top stage power line 1 and the bottom stage power line 2 is included to minimize the current flowing through the neutral line according to the strength condition of each of the detected phase currents in the top stage power line 1 and the bottom stage power lines 2.

Figure 5:
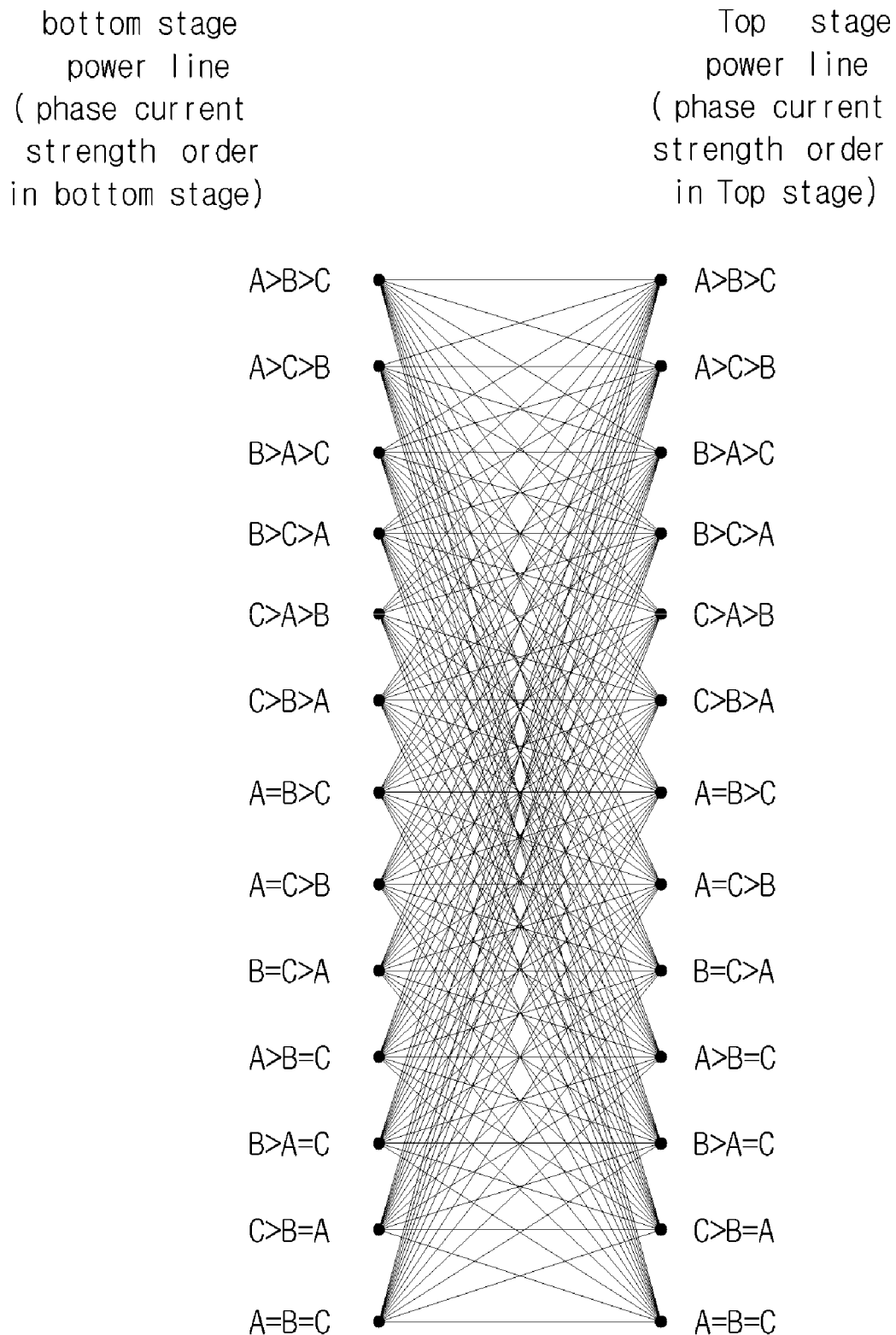
FIG. 5 is a diagram illustrating a combination of an order of phase current size on a top stage and a bottom stage capable of being generated at the three-phase four-wire type two stage electric pole.

Number of cases for the strength of each phase current in the top stage power line 1 and the bottom stage power line 2 is totally 169 as shown in FIG. 5. and the optimum conditions for the case of 169 number are represented at the table 1 as one example for the case that the first, the second and the third switch control unit 41, 42 and 43 and the first, the second and the third switch units 51, 52 and 53 are installed only on the top stage power line 1 in accordance with the embodiment of the present invention.

In the table 1, in case that the strengths of each phase current in the same power line are different from each other, the load arrangement is selected as an optimum condition in such a way that an order for the phases of the top stage power line 1 and an order of the phases of the bottom stage power line 2 according to strength of phase currents are opposite from each other, whereas in case that phases having the same current strength among each phase current exist in the same power line, a condition that the current flowing the neutral line becomes minimum is selected by means of a simulation.

Figure 6:
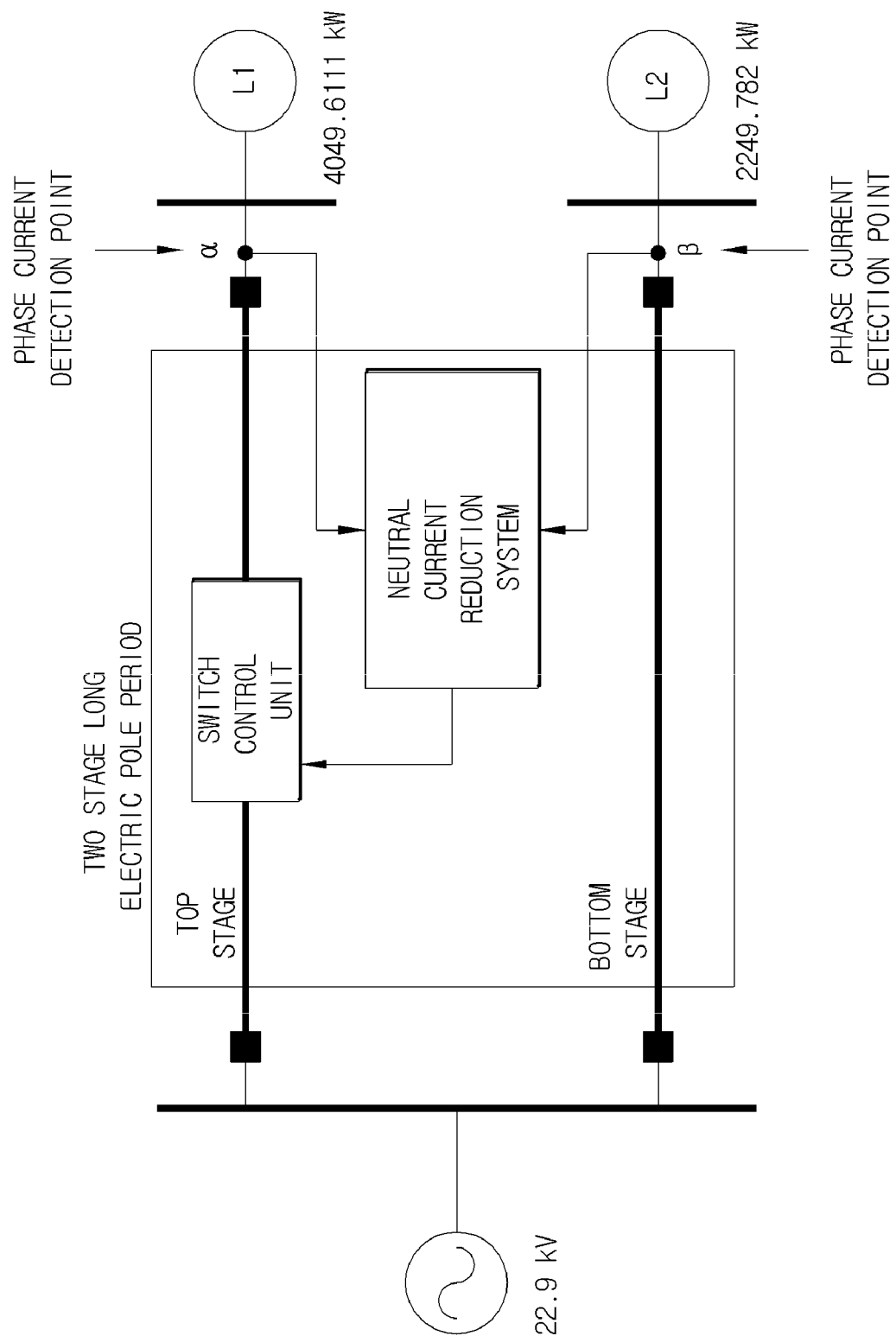
FIG. 6 is a diagram showing a schematic model to perform a simulation of the apparatus for reducing the current of the neutral line by using the load switching method in accordance with the embodiment of the present invention.
Figure 8A:
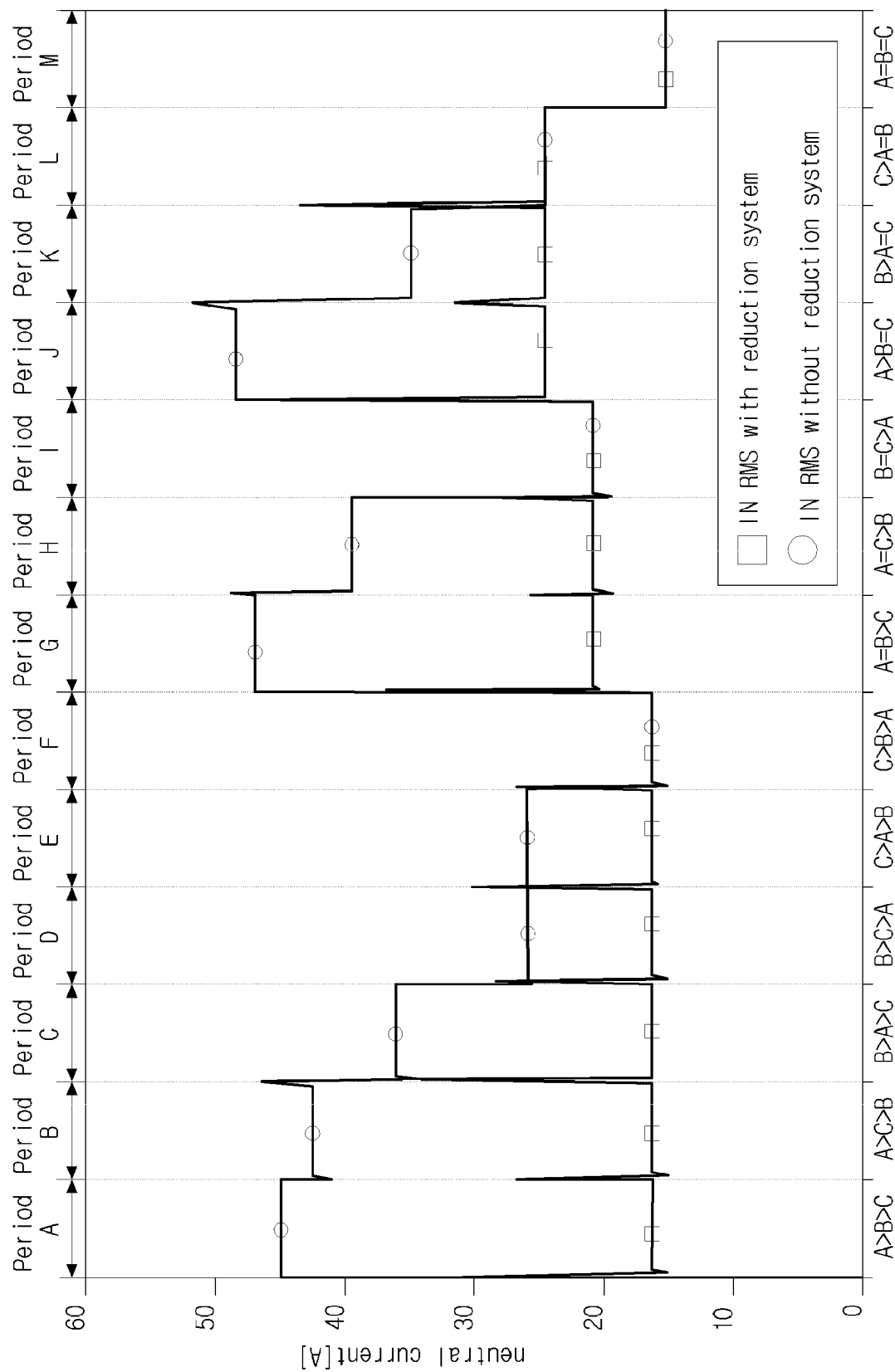
FIGS. 8a and 8m are diagrams depicting results to simulate a schematic model of FIG. 6 under a condition of table 1.
Figure 8B:
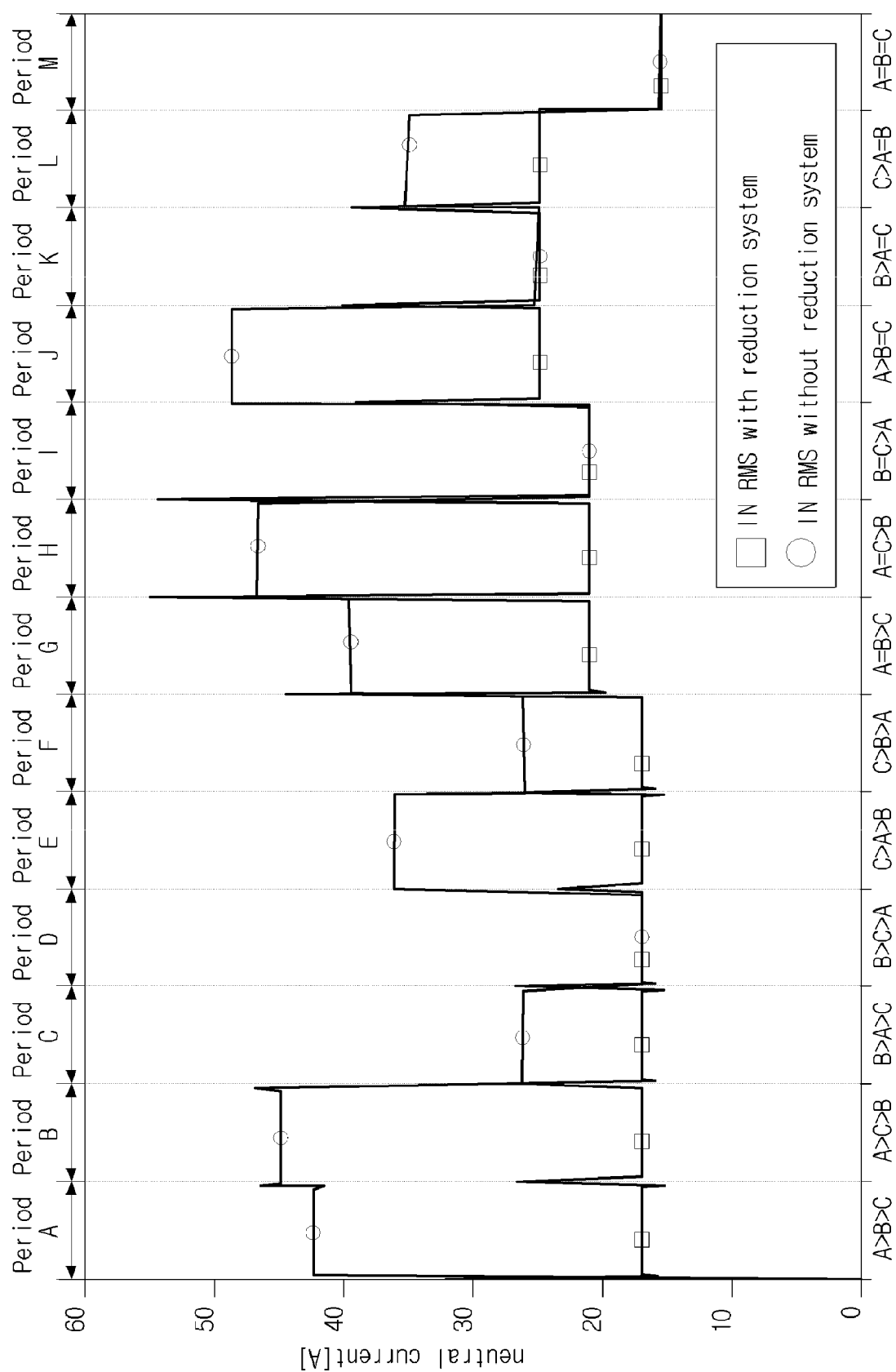
Figure 8C:
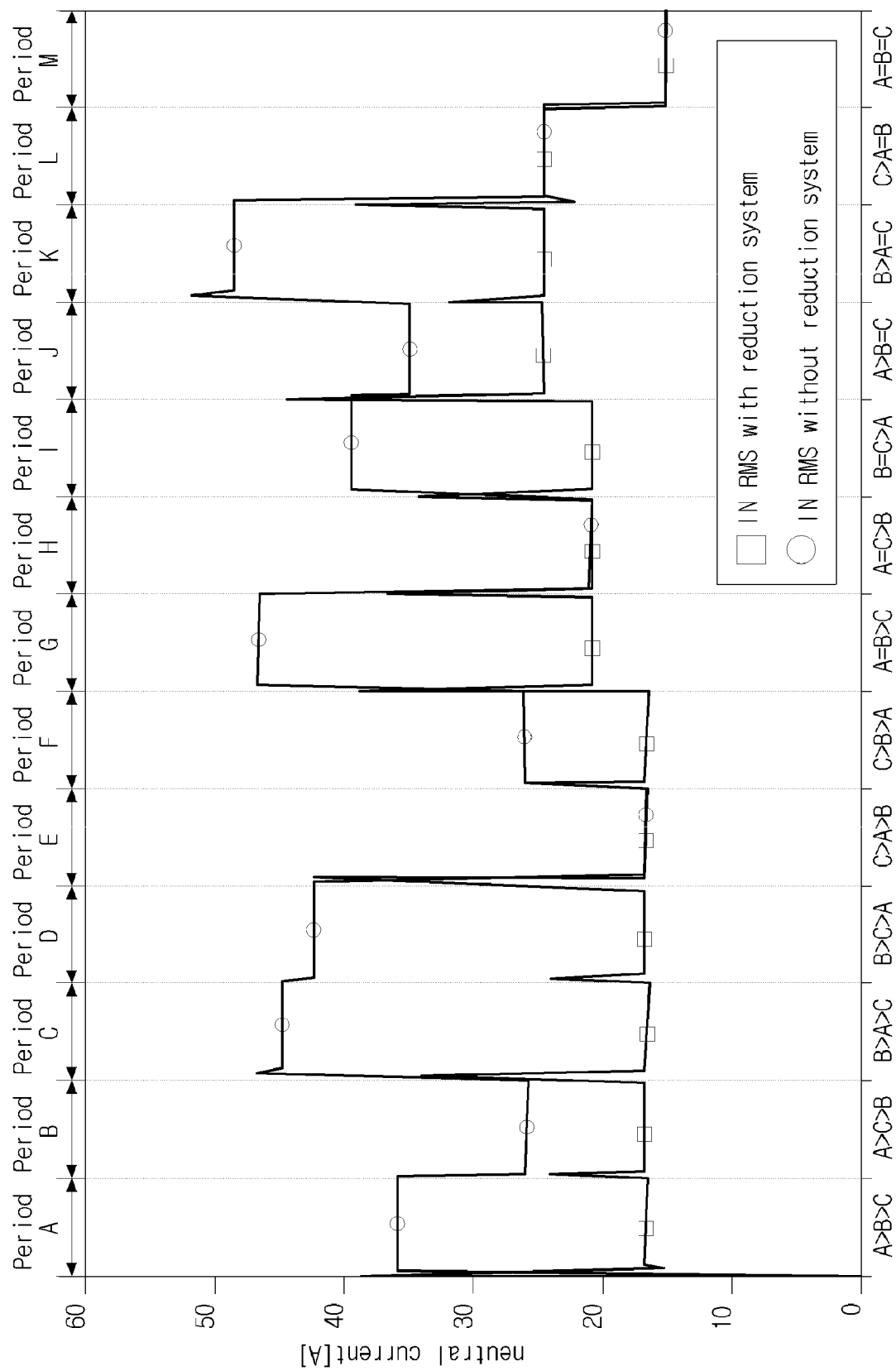
Figure 8D:
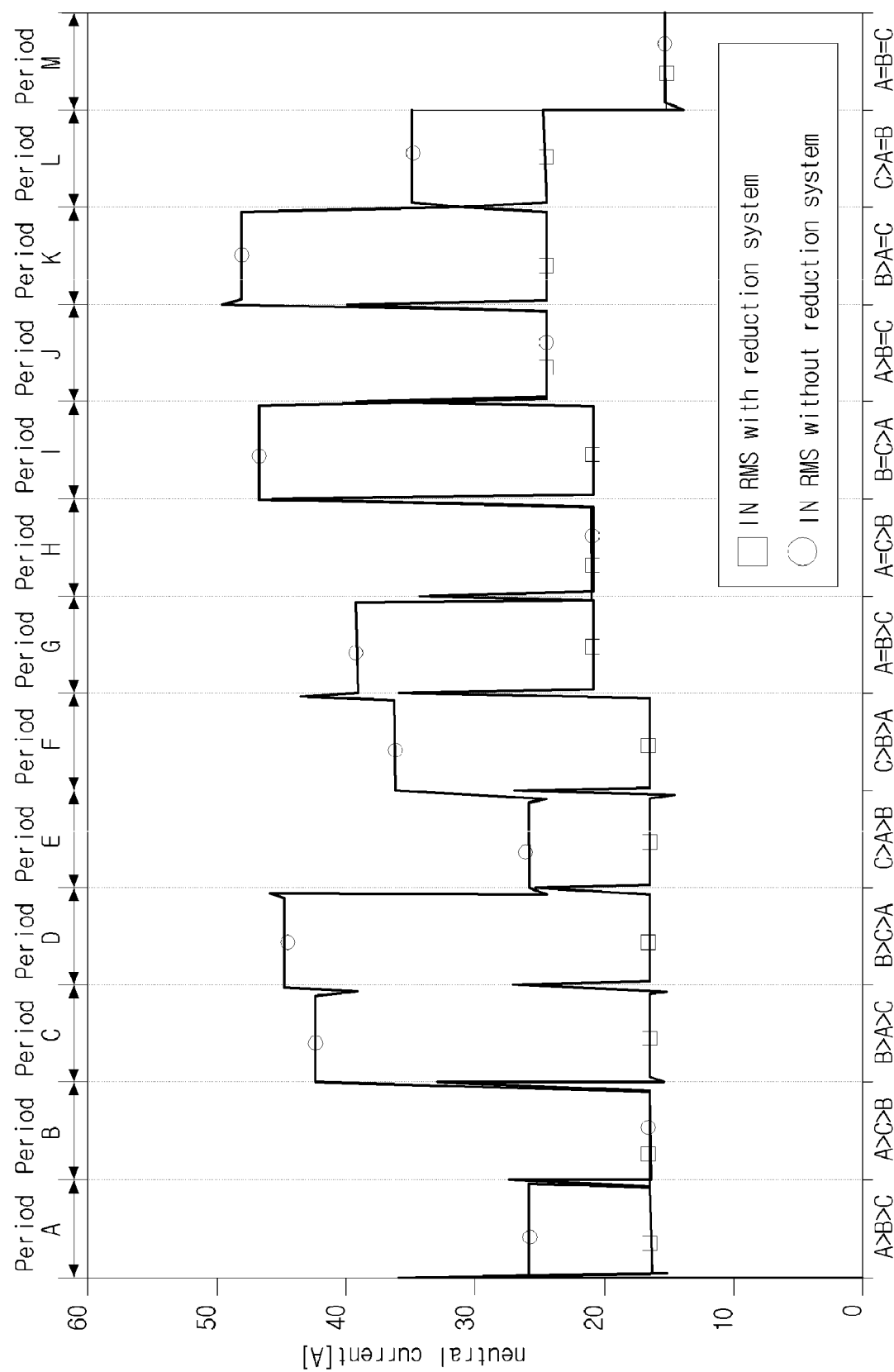
Figure 8E:
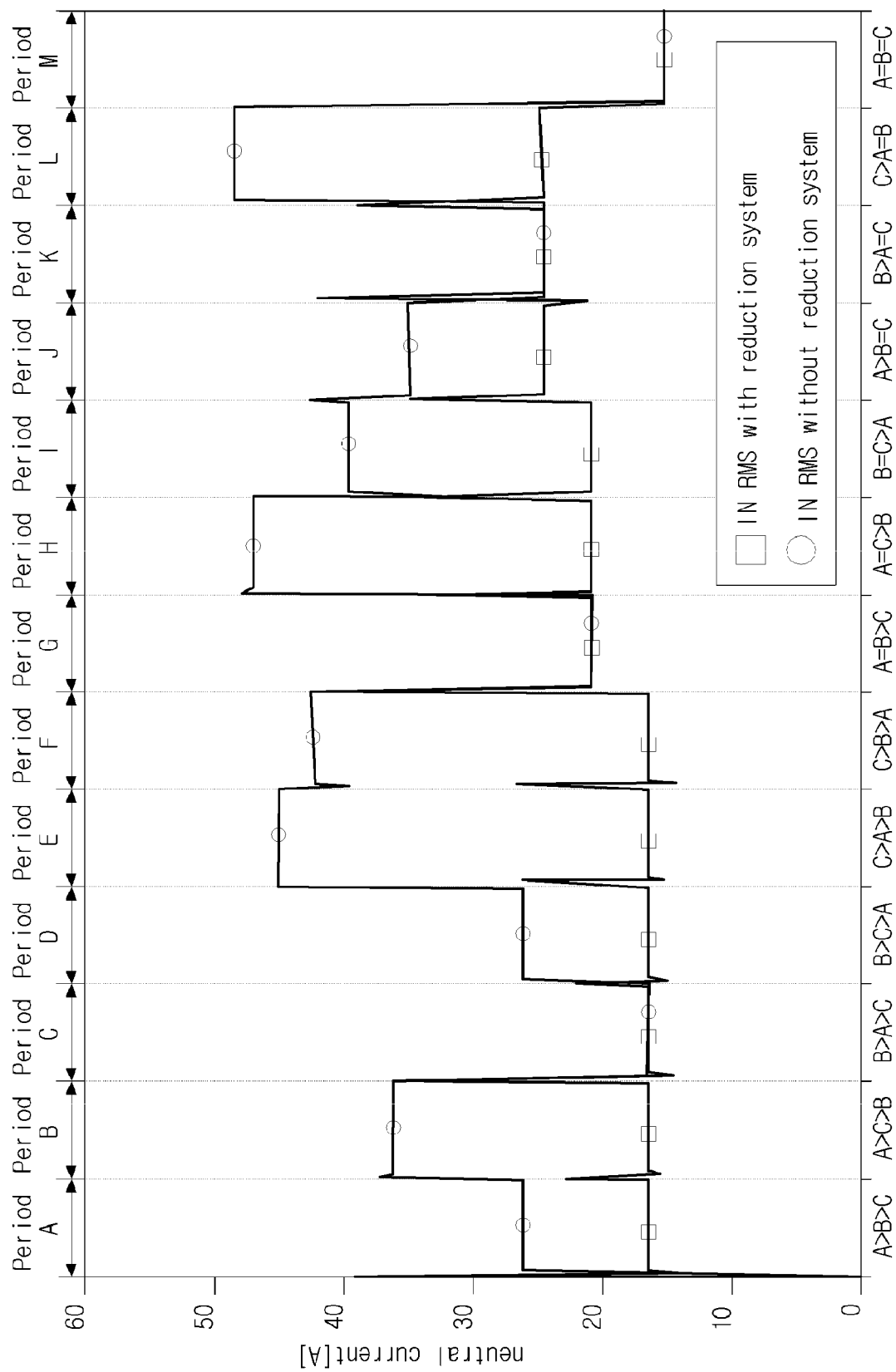
Figure 8G:
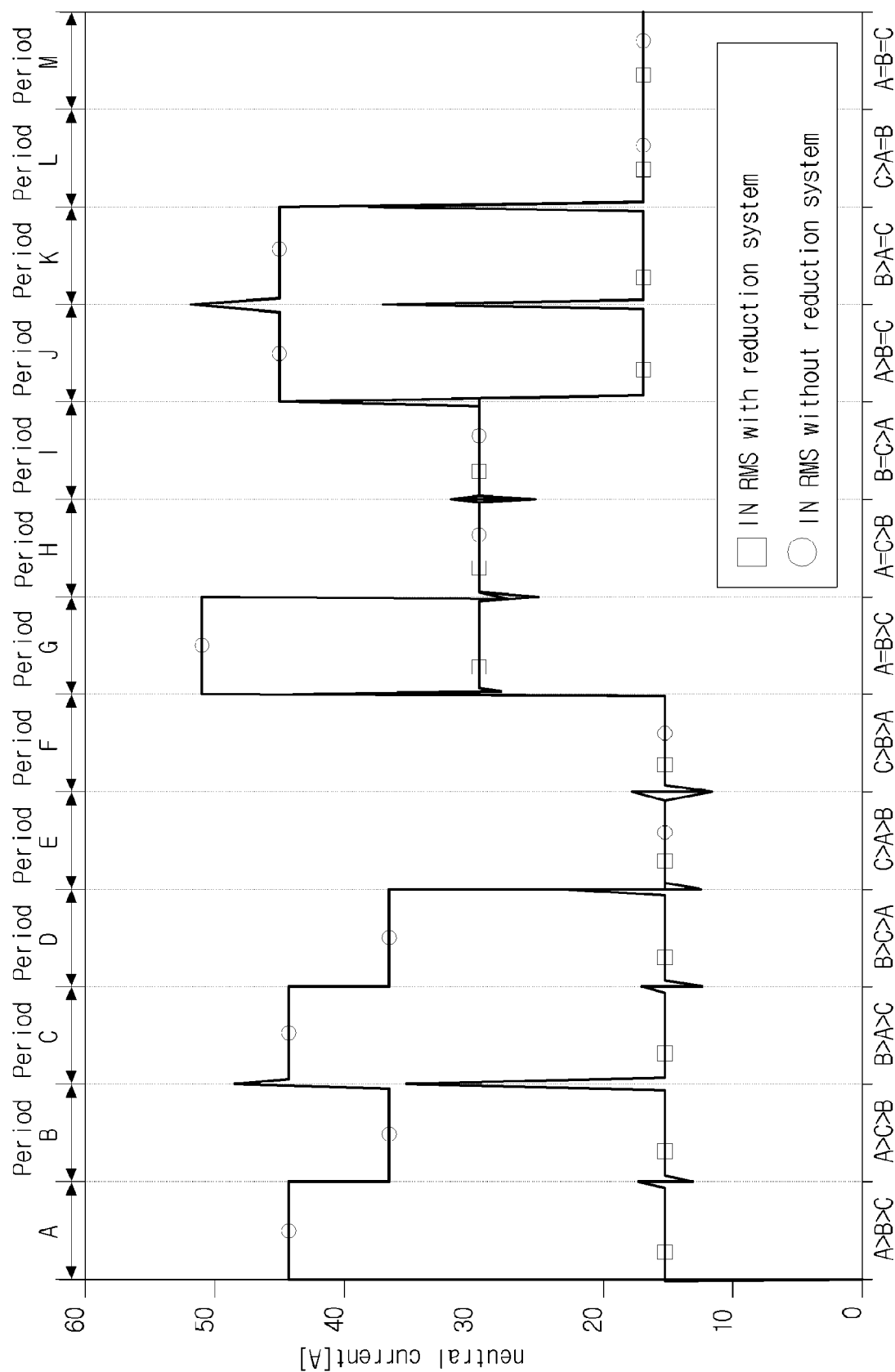
Figure 8H:
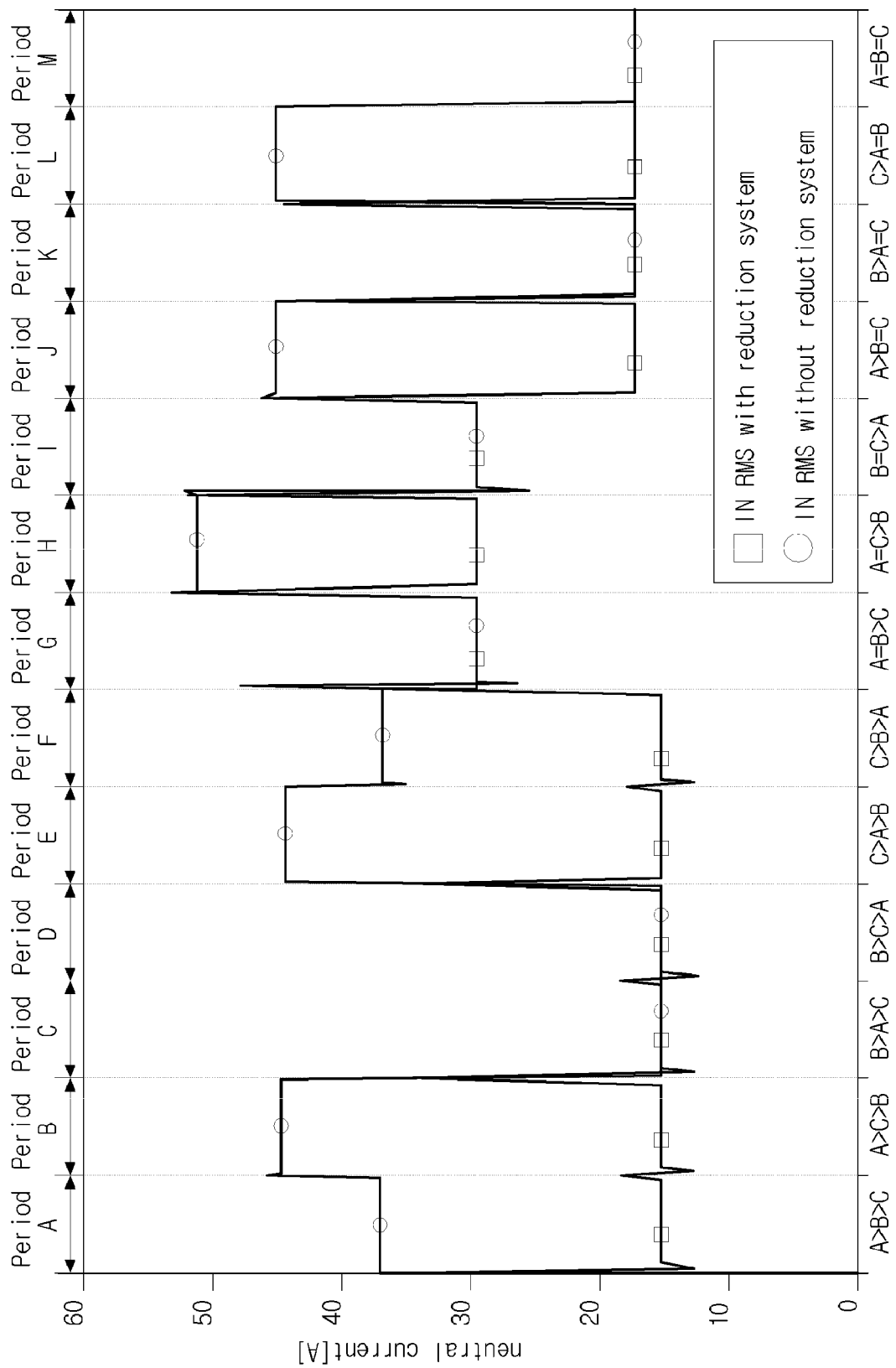
Figure 8I:
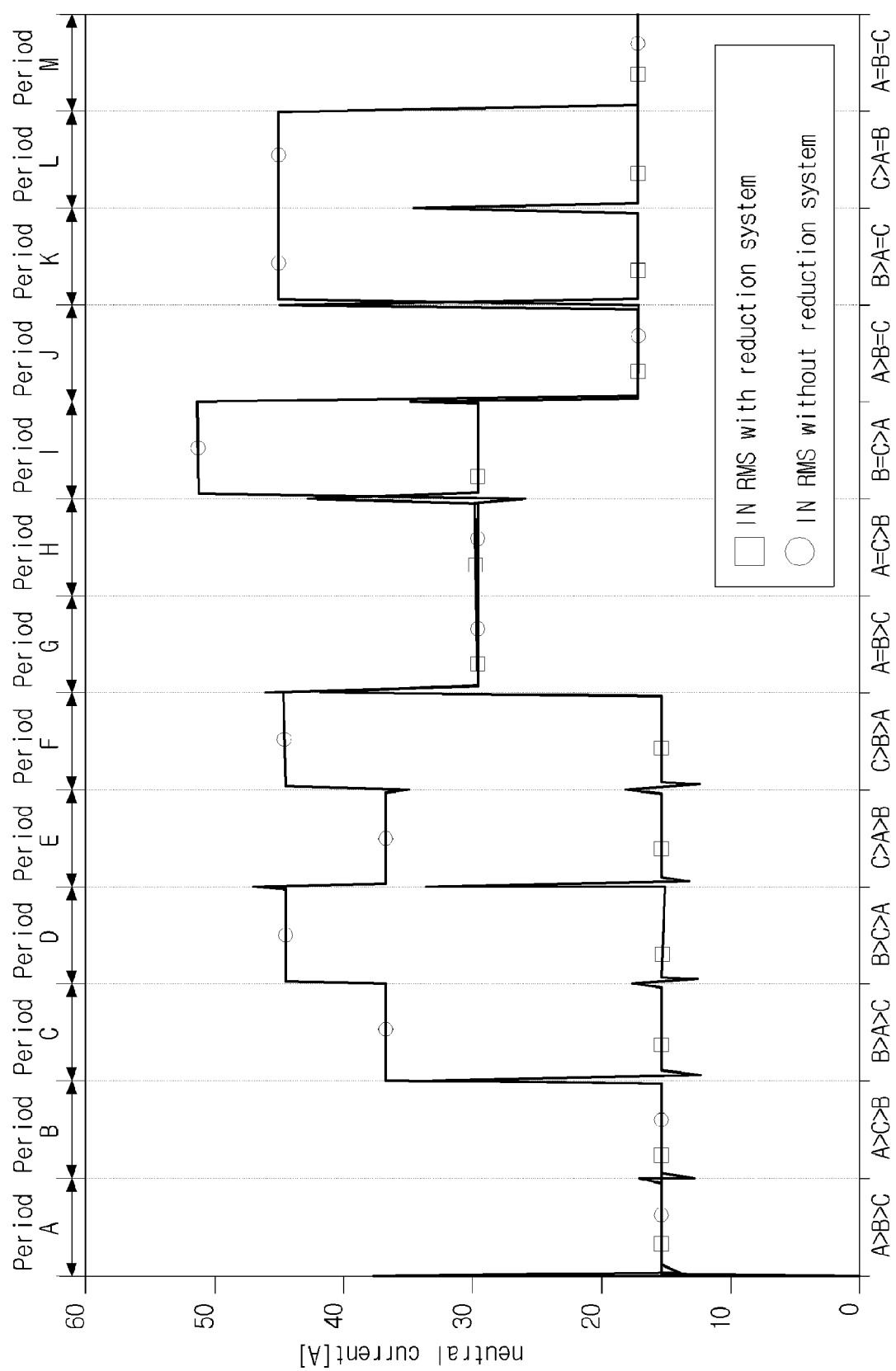
Figure 8J:
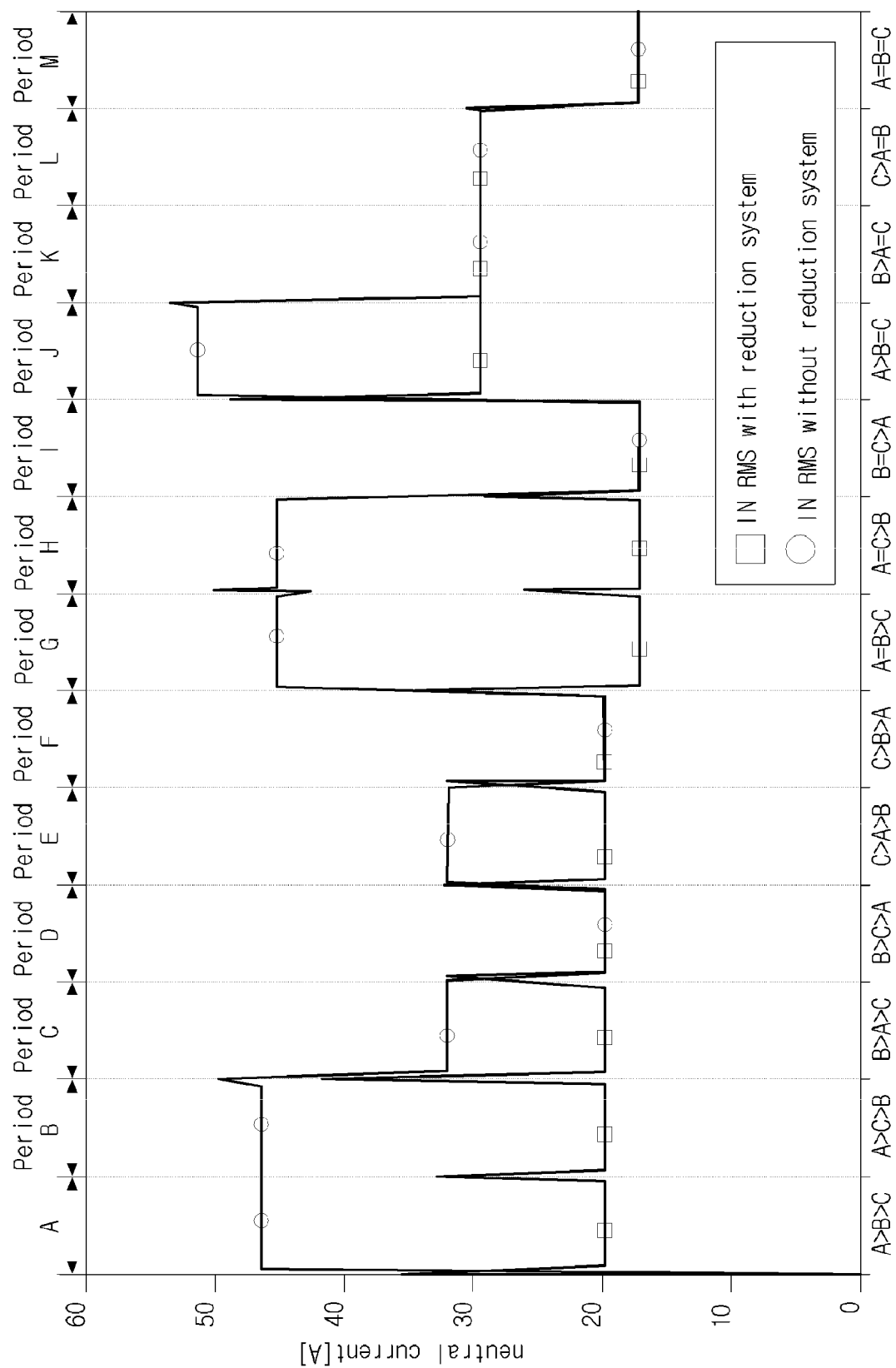
Figure 8K:
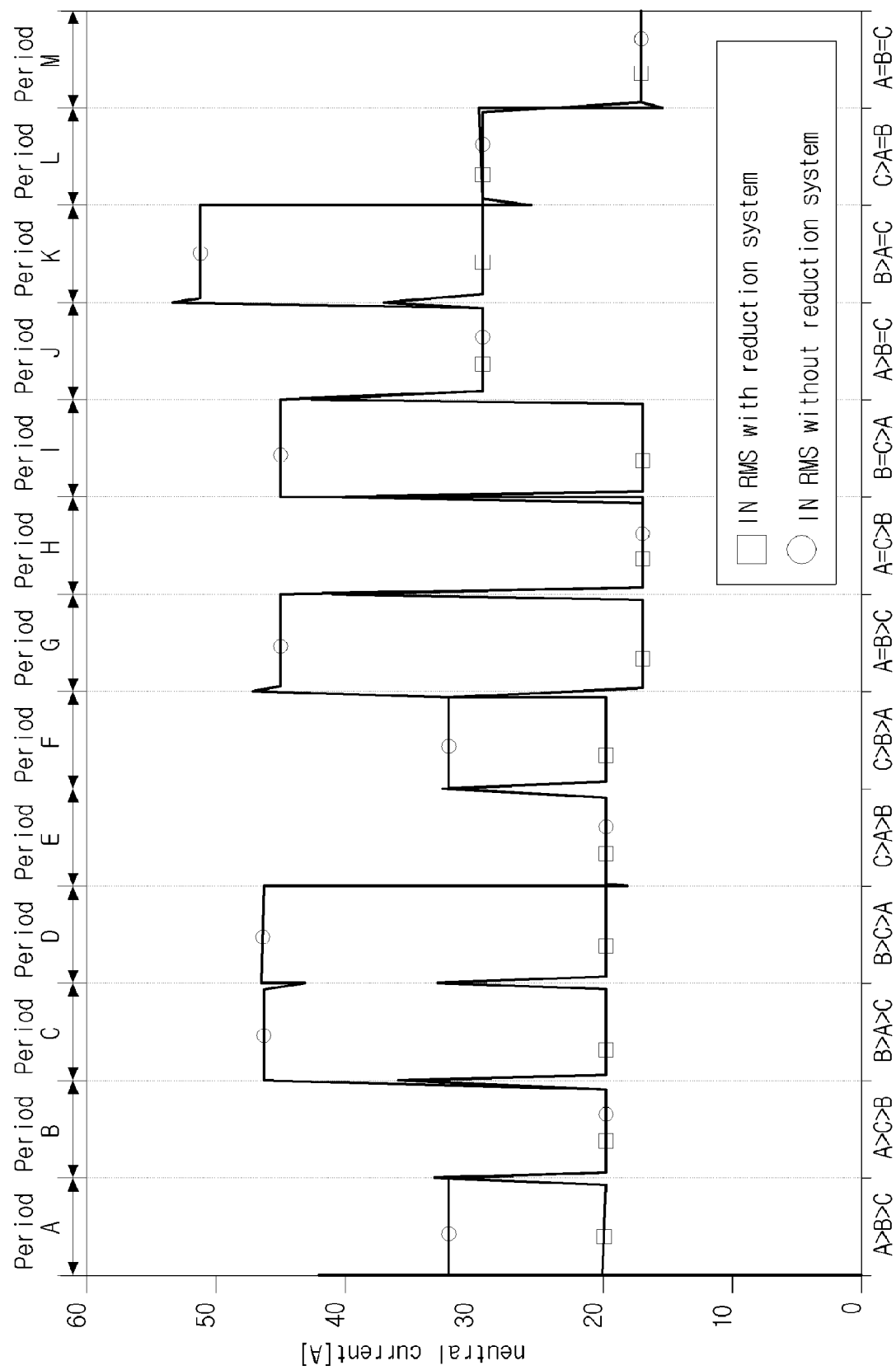
Figure 8I:
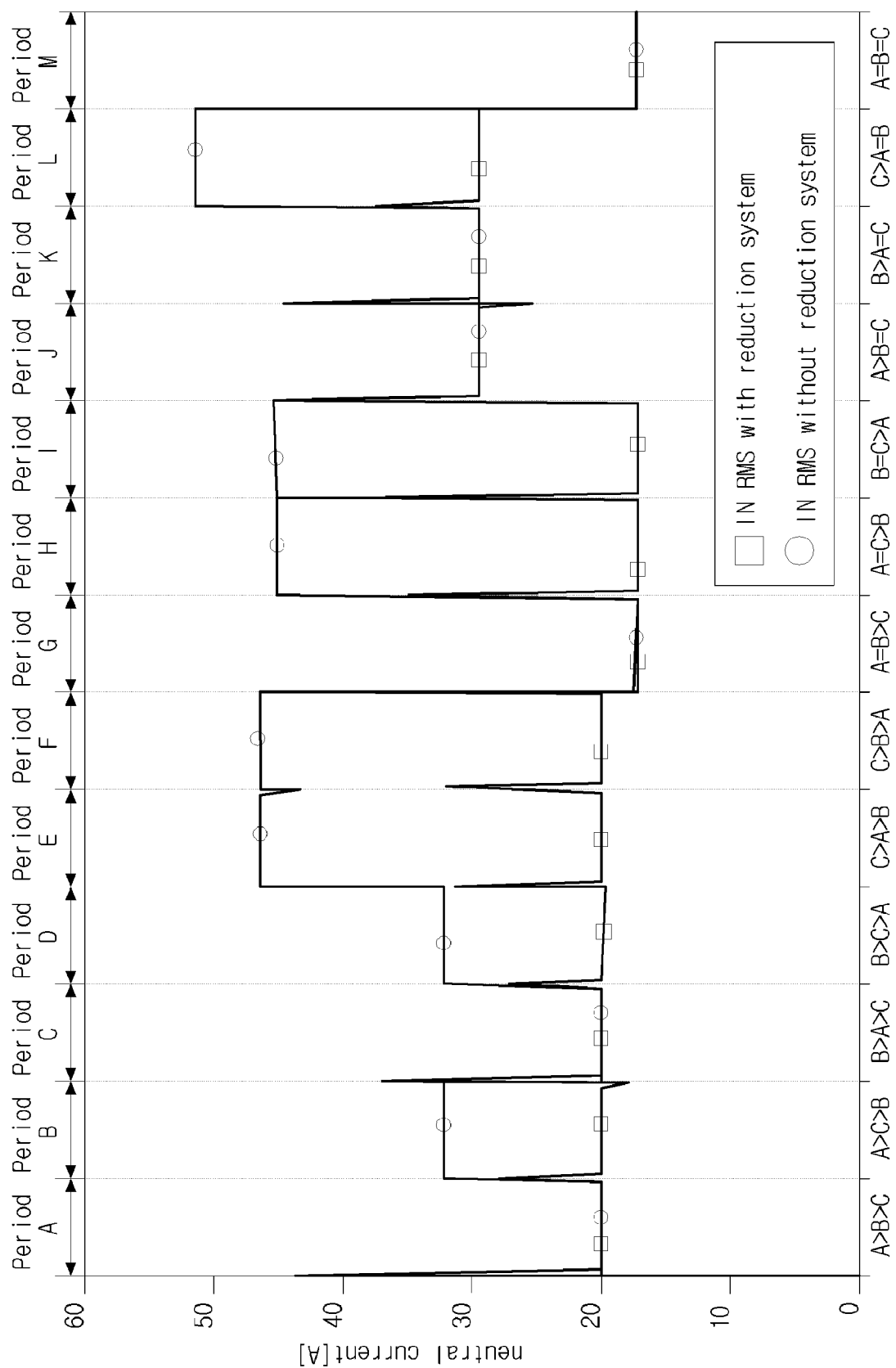
Figure 8M:
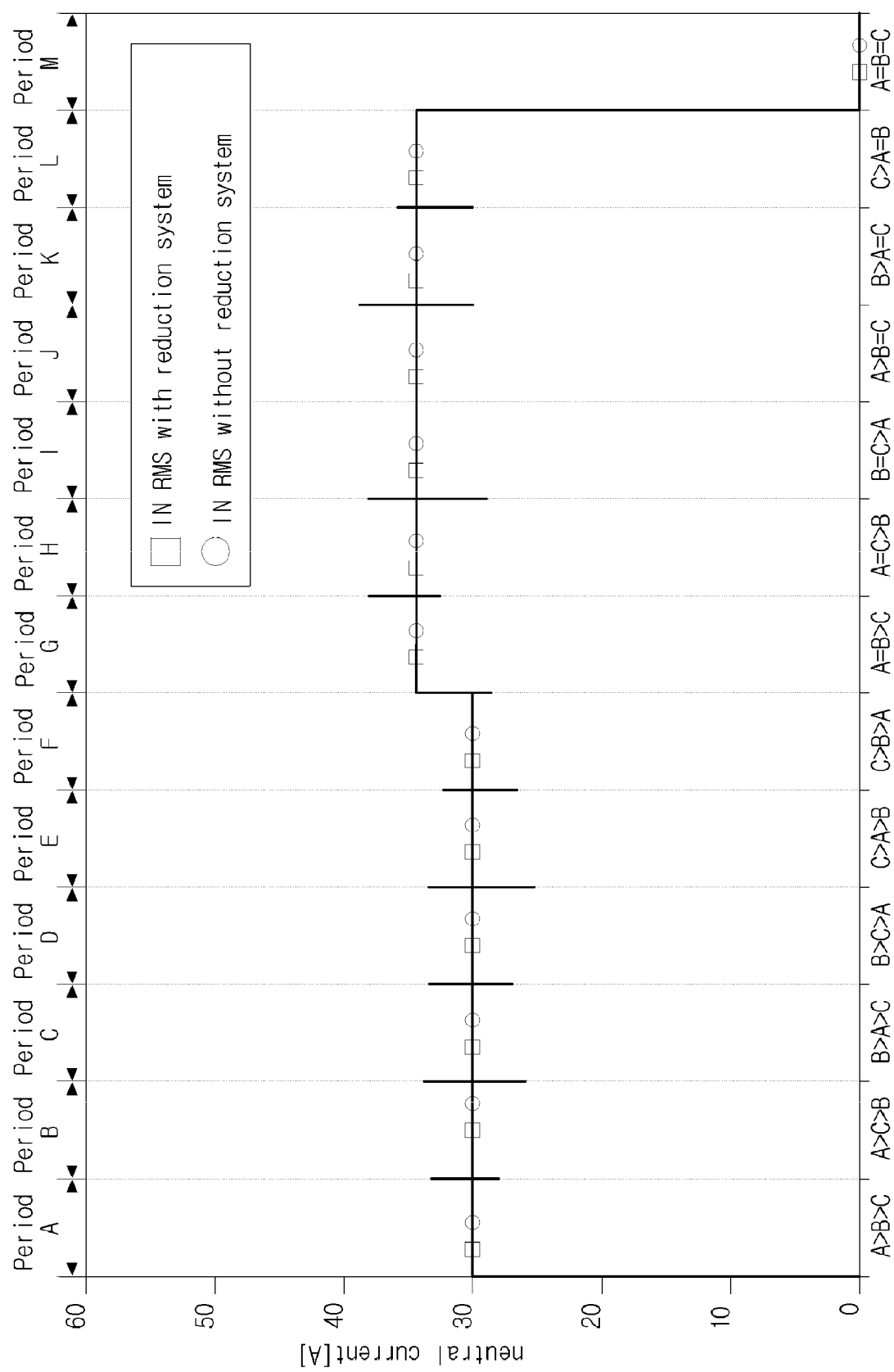

The simulation is implemented by using EMTP/MODELS to a system model shown in FIG. 6, it is constructed that a phase difference between each phase maintains 120° uniformly, 4049.611 Kw and 2249.784 Kw are connected to the top stage power line 1 and the bottom stage power line 2, respectively, and the phase current is detected at a load input terminal.

And also, the simulation is performed with varying a load imbalance ratio to 1.35:1.2:1.0 based on a power distribution operation condition adopted in many countries that the load imbalance ratio does not exceed a predetermined value. The predetermined value is 30% in Korea.

In the table 1, the first row represents a phase current strength condition to be detected at the top stage power line 1 and the first column represents a phase current strength condition to be detected at the bottom stage power line 2.

For example, phase currents detected at input terminals of the first, the second and the third loads 61, 62 and 63 of the top stage power line 1 are the phase currents, i.e., $I_A$, $I_B$ and $I_C$, on each of the A, the B and the C phases, if the orders of the phases of the top stage power line 1 and the bottom stage power line 2 according to the phase currents detected at the input terminals of the loads are A>B>C and A>B>C phases, respectively, in order to make the current flowing into the neutral line minimum, the order of the phases of the top stage power line 1 becomes C>B>A to be an inverse order of the bottom stage power line 2.

Therefore, the first, the second and the third switch units 51, 52 and 53 are controlled in such a way that the A phase of a power terminal is connected to the third load 63 having the smallest strength among the loads in the top stage power line 1, the B phase of the power terminal is connected to the second load 62 of a middle strength and the C phase of the power terminal is connected to the first load 61 having the largest strength. That is, as shown in the condition table of the table 1, the strengths of the phase currents detected at the load input terminal become C>B>A phases in order by closing switches $S_{AC}$, $S_{BB}$ and $S_{CA}$.

On the other hand, the order of the phases of the top stage power line 1 according to the detected phase currents is A>C>B in order as the load change with the lapse of time at the above-described state and in case that the order of the phases of the bottom stage power line 2 is A>B>C, in order to make the current flowing into the neutral line minimum, the order of the phases of the top stage power line 1 becomes C>B>A which is an inverse order of the bottom stage power line 2.

Therefore, the first, the second and the third switch units 51, 52 and 53 are controlled in such a way that the A phase of the power terminal is connected the second load 62 having the smallest strength among the loads of the top stage power line 1, the B phase of the power terminal is connected to the third load 63 in the middle strength and the C phase connected to the first load 61 having the largest strength. That is, as shown in the condition table of the table 1, the strengths of the phase currents detected at the load input terminal become C>B>A phases in order by closing switches $S_{AB}$, $S_{BC}$ and $S_{CA}$.

Here, the first, the second and the third loads 61, 62 and 63 of the neutral current reduction apparatus according to the present invention may include transformers connected to the first, the second and the third switch units 51, 52 and 53, respectively. Each high voltage terminals of the transformers is connected to the first, the second and the third switch units 51, 52 and 53 and each low voltage terminals of the transformers is connected to another loads.

phases by comparing each of the phase current strengths in the top stage power line 1 and the bottom stage power line 2(at step S120).

If the step S120 is finished, a load switching optimum condition selection module 23 selects an optimum condition of a load arrangement for the top stage power line 1, i.e., a control condition of the first, the second and the third switch units 51, 52 and 53 by searching each of the orders of the phases of the top stage power line 1 and the bottom stage power line 2 according to the strength of the phase currents from the condition table stored in the memory unit 30 to output a plurality of switching control signals (at step S130)

TABLE 1

| BS | | | | | | | TS | | | | | | |
|---|---|---|---|---|---|---|---|---|---|---|---|---|---|
| | A>B>C | A>C>B | B>A>C | B>C>A | C>A>B | C>B>A | A=B>C | C=A>B | B=C>A | A>B=C | B>A=C | C>A=B | A=B=C |
| A>B>C | $S_{AC}$ | $S_{AB}$ | $S_{AC}$ | $S_{AA}$ | $S_{AA}$ | $S_{AA}$ | $S_{AC}$ | $S_{AB}$ | $S_{BA}$ | $S_{AC}$ | $S_{AA}$ | $S_{AA}$ | $S_{AA}$ |
| | $S_{BA}$ | $S_{AC}$ | $S_{CB}$ | $S_{BC}$ | $S_{CB}$ | $S_{CB}$ | $S_{BC}$ | $S_{BA}$ | $S_{BC}$ | $S_{BA}$ | $S_{BC}$ | $S_{CB}$ | $S_{CB}$ |
| | $S_{CA}$ | $S_{CA}$ | $S_{CB}$ | $S_{CB}$ | $S_{CC}$ | $S_{CC}$ | $S_{CB}$ | $S_{CA}$ | $S_{CA}$ | $S_{CA}$ | $S_{CC}$ | $S_{CC}$ | $S_{CC}$ |
| A>C>B | $S_{AB}$ | $S_{AB}$ | $S_{AC}$ | $S_{AA}$ | $S_{AB}$ | $S_{AA}$ | $S_{AC}$ | $S_{AC}$ | $S_{AA}$ | $S_{CA}$ | $S_{AA}$ | $S_{AA}$ | $S_{AA}$ |
| | $S_{BC}$ | $S_{AA}$ | $S_{AB}$ | $S_{BB}$ | $S_{AC}$ | $S_{BA}$ | $S_{BC}$ | $S_{BB}$ | $S_{AC}$ | $S_{BB}$ | $S_{BC}$ | $S_{BC}$ | $S_{BB}$ |
| | $S_{CB}$ | $S_{CC}$ | $S_{CA}$ | $S_{CC}$ | $S_{CB}$ | $S_{CB}$ | $S_{CA}$ | $S_{AC}$ | $S_{CA}$ | $S_{CB}$ | $S_{CB}$ | $S_{CC}$ | $S_{CC}$ |
| B>A>C | $S_{AB}$ | $S_{AC}$ | $S_{AA}$ | $S_{AC}$ | $S_{AB}$ | $S_{AB}$ | $S_{AB}$ | $S_{AB}$ | $S_{AC}$ | $S_{AB}$ | $S_{AA}$ | $S_{AA}$ | $S_{AA}$ |
| | $S_{BC}$ | $S_{BB}$ | $S_{BC}$ | $S_{CA}$ | $S_{CA}$ | $S_{AA}$ | $S_{BC}$ | $S_{BC}$ | $S_{BA}$ | $S_{BC}$ | $S_{CA}$ | $S_{CB}$ | $S_{CB}$ |
| | $S_{CA}$ | $S_{CC}$ | $S_{CA}$ | $S_{CB}$ | $S_{CC}$ | $S_{CB}$ | $S_{CA}$ | $S_{AC}$ | $S_{CB}$ | $S_{CA}$ | $S_{CB}$ | $S_{CC}$ | $S_{AC}$ |
| B>C>A | $S_{AB}$ | $S_{AC}$ | $S_{AA}$ | $S_{AA}$ | $S_{AC}$ | $S_{BA}$ | $S_{BA}$ | $S_{AA}$ | $S_{AC}$ | $S_{AA}$ | $S_{AA}$ | $S_{AA}$ | $S_{AA}$ |
| | $S_{BA}$ | $S_{BA}$ | $S_{AC}$ | $S_{BC}$ | $S_{BA}$ | $S_{CA}$ | $S_{CA}$ | $S_{BC}$ | $S_{BA}$ | $S_{BA}$ | $S_{BC}$ | $S_{CA}$ | $S_{BB}$ |
| | $S_{CB}$ | $S_{CB}$ | $S_{CC}$ | $S_{CB}$ | $S_{CB}$ | $S_{BA}$ | $S_{AB}$ | $S_{BC}$ | $S_{CB}$ | $S_{CC}$ | $S_{CB}$ | $S_{CC}$ | $S_{CC}$ |
| C>A>B | $S_{AA}$ | $S_{AA}$ | $S_{AB}$ | $S_{CA}$ | $S_{AB}$ | $S_{AC}$ | $S_{AC}$ | $S_{AB}$ | $S_{AC}$ | $S_{AC}$ | $S_{CA}$ | $S_{AA}$ | $S_{AA}$ |
| | $S_{CB}$ | $S_{BC}$ | $S_{CA}$ | $S_{BA}$ | $S_{CB}$ | $S_{CA}$ | $S_{AA}$ | $S_{BA}$ | $S_{AA}$ | $S_{BA}$ | $S_{BA}$ | $S_{CB}$ | $S_{CB}$ |
| | $S_{CC}$ | $S_{CB}$ | $S_{CC}$ | $S_{CC}$ | $S_{CA}$ | $S_{AC}$ | $S_{BC}$ | $S_{CB}$ | $S_{BC}$ | $S_{CA}$ | $S_{CC}$ | $S_{CC}$ | $S_{CC}$ |
| C>B>A | $S_{AC}$ | $S_{AB}$ | $S_{AA}$ | $S_{AC}$ | $S_{AA}$ | $S_{BC}$ | $S_{CA}$ | $S_{CC}$ | $S_{CA}$ | $S_{AA}$ | $S_{AA}$ | $S_{AA}$ | $S_{AA}$ |
| | $S_{BA}$ | $S_{BC}$ | $S_{AB}$ | $S_{CA}$ | $S_{BB}$ | $S_{AA}$ | $S_{AA}$ | $S_{AA}$ | $S_{AC}$ | $S_{BA}$ | $S_{CB}$ | $S_{BC}$ | $S_{BB}$ |
| | $S_{CA}$ | $S_{CA}$ | $S_{CB}$ | $S_{AC}$ | $S_{CA}$ | $S_{BB}$ | $S_{BB}$ | $S_{AC}$ | $S_{AA}$ | $S_{CC}$ | $S_{AA}$ | $S_{CC}$ | $S_{CC}$ |
| A=B>C | $S_{AC}$ | $S_{AB}$ | $S_{AA}$ | $S_{AB}$ | $S_{AA}$ | $S_{CA}$ | $S_{CC}$ | $S_{CB}$ | $S_{BC}$ | $S_{AC}$ | $S_{BB}$ | $S_{AA}$ | $S_{AA}$ |
| | $S_{BA}$ | $S_{AC}$ | $S_{AB}$ | $S_{CA}$ | $S_{BA}$ | $S_{CB}$ | $S_{AA}$ | $S_{CB}$ | $S_{CB}$ | $S_{CB}$ | $S_{CC}$ | $S_{BC}$ | $S_{BB}$ |
| | $S_{CB}$ | $S_{CA}$ | $S_{CC}$ | $S_{AC}$ | $S_{CA}$ | $S_{AB}$ | $S_{BC}$ | $S_{BB}$ | $S_{AA}$ | $S_{CA}$ | $S_{AA}$ | $S_{CC}$ | $S_{CC}$ |
| C=A>B | $S_{AB}$ | $S_{AB}$ | $S_{AB}$ | $S_{AC}$ | $S_{AC}$ | $S_{CB}$ | $S_{CB}$ | $S_{CA}$ | $S_{BC}$ | $S_{AC}$ | $S_{BC}$ | $S_{AB}$ | $S_{AA}$ |
| | $S_{AC}$ | $S_{BC}$ | $S_{CA}$ | $S_{BA}$ | $S_{BA}$ | $S_{AB}$ | $S_{CA}$ | $S_{AB}$ | $S_{CA}$ | $S_{BA}$ | $S_{CB}$ | $S_{EB}$ | $S_{BB}$ |
| | $S_{CB}$ | $S_{CA}$ | $S_{AC}$ | $S_{AC}$ | $S_{CC}$ | $S_{CA}$ | $S_{BC}$ | $S_{BA}$ | $S_{BA}$ | $S_{CC}$ | $S_{AC}$ | $S_{CC}$ | $S_{CC}$ |
| B=C>A | $S_{AC}$ | $S_{AB}$ | $S_{AA}$ | $S_{AA}$ | $S_{AC}$ | $S_{CC}$ | $S_{CC}$ | $S_{CA}$ | $S_{CA}$ | $S_{AA}$ | $S_{CB}$ | $S_{AA}$ | $S_{AA}$ |
| | $S_{BC}$ | $S_{BA}$ | $S_{CB}$ | $S_{BC}$ | $S_{AA}$ | $S_{AA}$ | $S_{AC}$ | $S_{AA}$ | $S_{CA}$ | $S_{BA}$ | $S_{AC}$ | $S_{BB}$ | $S_{BB}$ |
| | $S_{CA}$ | $S_{CC}$ | $S_{CC}$ | $S_{CA}$ | $S_{CB}$ | $S_{BB}$ | $S_{BA}$ | $S_{BC}$ | $S_{CA}$ | $S_{CC}$ | $S_{CA}$ | $S_{CC}$ | $S_{CC}$ |
| A>B=C | $S_{AA}$ | $S_{AA}$ | $S_{AA}$ | $S_{AA}$ | $S_{AC}$ | $S_{CC}$ | $S_{CC}$ | $S_{CB}$ | $S_{AB}$ | $S_{AC}$ | $S_{CC}$ | $S_{AA}$ | $S_{AA}$ |
| | $S_{BC}$ | $S_{BB}$ | $S_{AB}$ | $S_{CB}$ | $S_{AC}$ | $S_{AB}$ | $S_{AB}$ | $S_{AC}$ | $S_{AB}$ | $S_{BA}$ | $S_{AA}$ | $S_{BC}$ | $S_{BC}$ |
| | $S_{CB}$ | $S_{CC}$ | $S_{CC}$ | $S_{CA}$ | $S_{CA}$ | $S_{BA}$ | $S_{BC}$ | $S_{BA}$ | $S_{CB}$ | $S_{CA}$ | $S_{CB}$ | $S_{CC}$ | $S_{CC}$ |
| B>A=C | $S_{AB}$ | $S_{AB}$ | $S_{AC}$ | $S_{AA}$ | $S_{AA}$ | $S_{CA}$ | $S_{CA}$ | $S_{CB}$ | $S_{AA}$ | $S_{AB}$ | $S_{CC}$ | $S_{AB}$ | $S_{AB}$ |
| | $S_{BC}$ | $S_{AC}$ | $S_{AB}$ | $S_{BC}$ | $S_{BC}$ | $S_{AB}$ | $S_{AA}$ | $S_{AA}$ | $S_{BC}$ | $S_{CB}$ | $S_{AA}$ | $S_{CB}$ | $S_{AA}$ |
| | $S_{CC}$ | $S_{CA}$ | $S_{CA}$ | $S_{CC}$ | $S_{CC}$ | $S_{BA}$ | $S_{CB}$ | $S_{CB}$ | $S_{CA}$ | $S_{CC}$ | $S_{BA}$ | $S_{CC}$ | $S_{BB}$ |
| C>A=B | $S_{AA}$ | $S_{AA}$ | $S_{AA}$ | $S_{AB}$ | $S_{AB}$ | $S_{CC}$ | $S_{CC}$ | $S_{CC}$ | $S_{AB}$ | $S_{AC}$ | $S_{CC}$ | $S_{AA}$ | $S_{CC}$ |
| | $S_{CB}$ | $S_{BB}$ | $S_{CB}$ | $S_{BC}$ | $S_{CA}$ | $S_{AA}$ | $S_{AA}$ | $S_{AC}$ | $S_{AC}$ | $S_{CA}$ | $S_{AA}$ | $S_{CB}$ | $S_{AC}$ |
| | $S_{CB}$ | $S_{CC}$ | $S_{CC}$ | $S_{CA}$ | $S_{CC}$ | $S_{AC}$ | $S_{BC}$ | $S_{BA}$ | $S_{CC}$ | $S_{CB}$ | $S_{BC}$ | $S_{CC}$ | $S_{BC}$ |
| A=B=C | $S_{AA}$ | $S_{AA}$ | $S_{AA}$ | $S_{AB}$ | $S_{AB}$ | $S_{CC}$ | $S_{CC}$ | $S_{CC}$ | $S_{AB}$ | $S_{AC}$ | $S_{CC}$ | $S_{AA}$ | $S_{AA}$ |
| | $S_{CB}$ | $S_{BB}$ | $S_{CB}$ | $S_{BC}$ | $S_{CA}$ | $S_{AA}$ | $S_{AA}$ | $S_{AC}$ | $S_{AC}$ | $S_{CA}$ | $S_{AA}$ | $S_{CB}$ | $S_{BB}$ |
| | $S_{CB}$ | $S_{CC}$ | $S_{CC}$ | $S_{CA}$ | $S_{CC}$ | $S_{AC}$ | $S_{BC}$ | $S_{BA}$ | $S_{CC}$ | $S_{CB}$ | $S_{BC}$ | $S_{CC}$ | $S_{CC}$ |

FIG. 7 is a flow chart representing a method for reducing a neutral current using a load switching method according to one embodiment of the present invention.

At first, if a top stage phase current measuring unit 11 and a bottom stage phase current measuring unit 12 detect phase currents at input terminals of the loads connected to each of the top stage power line 1 and the bottom stage power line 2(at step S100), the detected phase currents are converted into effective values at an effective value converting module 21 of the control unit 20(at step S110).

If the step S110 is finished, a phase current comparison module 22 of the control unit 20 determines an order of If the step S130 is finished, the first, the second and the third switch control units which receive the switching control signals control operations of each of the first, the second and the third switch units 51, 52 and 53(at step S140).

If the step S140 is finished, after a status whether the control finish signal is inputted or not is determined, the control is finished for the inputted case, whereas the S100 step is repeatedly performed in case that the control finishing signal is not inputted (at step S150).

Results of simulating the strengths of currents flowing into a neutral line at the three-phase four-wire type two stage electric pole in power distribution system in accordance with one embodiment of the present invention are represented at FIG. 8a to FIG. 8m by comparing cases of applying the neutral current reduction apparatus and method in accordance with the present invention with cases of not applying the neutral current reduction apparatus and method.

FIG. 8a to FIG. 8m sequentially represent that each of the phase current strength conditions in the bottom phase power line 2 is each of the conditions of the first row in the table 1, in each of the drawings, the periods A to M represent the cases that each of the phase current strength conditions are changed into each of the conditions in the first column of the table 1.

As shown in FIG. 8a to FIG. 8m, in case that the neutral current reduction apparatus and method in accordance with the present invention is applied, the current flowing into the neutral line drastically reduces in comparison with a case that the neutral current reduction apparatus and method in accordance with the present invention is not applied.

As described in detail above, the neutral current reduction apparatus and method in accordance with the present invention is capable of being applied as means for reducing a current flowing into a neutral line of three-phase four-wire type two stage electric pole employed as one of standard power distribution.

What is claimed is:

1. An apparatus for reducing a current flowing through a neutral line of a three-phase four-wire type two stage electric pole distribution system, comprising:
   a phase current detection unit detecting phase currents in each of a top stage power line and a bottom stage power line;
   a load switching unit changing an arrangement of loads connected to each phase of at least one among the top stage power line and the bottom stage power line; and
   a control unit comparing strengths of the detected phase currents of the top stage power line and the bottom stage power line and controlling the load switching unit so as to change the arrangement of the loads connected to each phase of at least one among the top stage power line and the bottom stage power line according to the comparison result.

2. The apparatus as recited in claim 1, wherein the control unit changes the arrangement of the loads such that an order of the phases of the top stage power line and an order of the phases of the bottom stage power line according to strength of phase currents are opposite from each other.

3. The apparatus as recited in claim 2, further comprising a memory unit storing a condition table about the order of phases of the top stage power line and the bottom stage power line according to strength of phase currents, and the arrangement of the loads corresponding to the order according to the strength of the phase currents;
   wherein the control unit searches the arrangement of the loads corresponding to the strength of the phase currents detected by the phase current detection unit from the condition table and changes the arrangement of the load according to the searched arrangement in case that phases having the same current strength to each other exist in one of the top stage power line and the bottom stage power line.

4. The apparatus as recited in claim 3, wherein the control unit changes the arrangement of the loads connected to one of the top stage power line and the bottom stage power line with reference to the order according to the strength of the phase currents of each phases of the other of the top stage power line and the bottom stage power line.

5. The apparatus as recited in claim 1, wherein the phase current detection unit is prepared at an input stage of the loads connected to each of the top stage power line and the bottom stage power line.

6. The apparatus as recited in claim 2, wherein the phase current detection unit is prepared at an input stage of the loads connected to each of the top stage power line and the bottom stage power line.

7. The apparatus as recited in claim 3, wherein the phase current detection unit is prepared at an input stage of the loads connected to each of the top stage power line and the bottom stage power line.

8. The apparatus as recited in claim 4, wherein the phase current detection unit is prepared at an input stage of the loads connected to each of the top stage power line and the bottom stage power line.

9. The apparatus as recited in claim 5, wherein the control unit converts the detected phase currents into effective values to compare the strength of the converted effective values.

10. The apparatus as recited in claim 6, wherein the control unit converts the detected phase currents into effective values to compare the strength of the converted effective values.

11. The apparatus as recited in claim 7, wherein the control unit converts the detected phase currents into effective values to compare the strength of the converted effective values.

12. The apparatus as recited in claim 8, wherein the control unit converts the detected phase currents into effective values to compare the strength of the converted effective values.

13. The apparatus as recited in claim 9, wherein the load switching units are prepared at each phase of any one power line among the top stage power line and the bottom stage power line, and each of the load switching units connects any one among loads connected to each phase of any one power line according to a control signal of the controlling unit.

14. The apparatus as recited in claim 10, wherein the load switching units are prepared at each phase of any one power line among the top stage power line and the bottom stage power line, and each of the load switching units connects any one among loads connected to each phase of any one power line according to a control signal of the controlling unit.

15. The apparatus as recited in claim 11, wherein the load switching units are prepared at each phase of any one power line among the top stage power line and the bottom stage power line, and each of the load switching units connects any one among loads connected to each phase of any one power line according to a control signal of the controlling unit.

16. The apparatus as recited in claim 12, wherein the load switching units are prepared at each phase of any one power line among the top stage power line and the bottom stage power line, and each of the load switching units connects any one among loads connected to each phase of any one power line according to a control signal of the controlling unit.

17. The apparatus as recited in claim 13, wherein each of the load switching units comprises a relay.

18. The apparatus as recited in claim 14, wherein each of the load switching units comprises a relay.

19. The apparatus as recited in claim 15, wherein each of the load switching units comprises a relay.

20. The apparatus as recited in claim 16, wherein each of the load switching units comprises a relay.

21. A method for reducing a current flowing into a neutral line of a three-phase four-wire type two stage electric pole distribution system, comprising:
   detecting phase currents in each of a top stage power line and a bottom stage power line; and
   comparing the detected strengths of the phase currents of the top stage power line and the bottom stage power line; and
   changing an arrangement of loads connected to each phase of any one of the top stage power line and the bottom stage power line according to the comparison result.

22. The method as recited in claim 21, wherein the arrangement of the loads is changed in such a way that an order of the phases of the top stage power line and an order of the phases of the bottom stage power line according to strength of phase currents are opposite from each other in step of changing the arrangement of loads.

23. The method as recited in claim 22, further comprising storing a condition table about the order for phases of the top stage power line and the bottom stage power line according to strength of phase currents, and the arrangement of the loads corresponding to the order according the strength of the phase currents in a memory unit;
   wherein changing the arrangement of loads comprises searching the arrangement of the load corresponding to the strength of the phase currents detected by the phase current detection unit from the condition table and changing the arrangement of the loads according to the searched arrangement in case that phases having the same current strength to each other exist in one of the top stage power line and the bottom stage power line.

24. The method as recited in claim 23, wherein changing the arrangement of loads is performed by changing the arrangement of the loads connected to one of the top stage power line and the bottom stage power line with reference to the order of the phases according to the strength of the phase currents of each phases of the other of the top stage power line and the bottom stage power line.

25. The method as recited in claim 21, wherein detecting phase currents is performed by detecting the phase current at an input stage of the loads connected to each of the top stage power line and the bottom stage power line.

26. The method as recited in claim 22, wherein detecting phase currents is performed by detecting the phase current at an input stage of the loads connected to each of the top stage power line and the bottom stage power line.

27. The method as recited in claim 23, wherein detecting phase currents is performed by detecting the phase current at an input stage of the loads connected to each of the top stage power line and the bottom stage power line.

28. The method as recited in claim 24, wherein detecting phase currents is performed by detecting the phase current at an input stage of the loads connected to each of the top stage power line and the bottom stage power line.

29. The method as recited in claim 25, wherein comparing the detected strengths of the phase currents is performed by comparing effective values converted from the detected phase currents to compare the strength of the detected phase currents.

30. The method as recited in claim 26, wherein comparing the detected strengths of the phase currents is performed by comparing effective values converted from the detected phase currents to compare the strength of the detected phase currents.

31. The method as recited in claim 27, wherein comparing the detected strengths of the phase currents is performed by comparing effective values converted from the detected phase currents to compare the strength of the detected phase currents.

32. The method as recited in claim 28, wherein comparing the detected strengths of the phase currents is performed by comparing effective values converted from the detected phase currents to compare the strength of the detected phase currents.

33. The method as recited in claim 24, wherein changing the arrangement of loads is performed by changing the arrangement of each high voltage terminals of transformers connected to one of the top stage power line and the bottom stage power line with reference to the order of the phases according to the strength of the phase currents of each phases of the other of the top stage power line and the bottom stage power line.

* * * * *